(12) United States Patent
Spektor

(10) Patent No.: US 9,168,785 B2
(45) Date of Patent: Oct. 27, 2015

(54) CASTER WHEEL BRAKING SYSTEMS

(71) Applicant: Hamilton Caster & Manufacturing Company, Hamilton, OH (US)

(72) Inventor: Yefim Spektor, Mason, OH (US)

(73) Assignee: Hamilton Caster & Manufacturing Company, Hamilton, OH (US)

(*) Notice: Subject to any disclaimer, the term of this patent is extended or adjusted under 35 U.S.C. 154(b) by 38 days.

(21) Appl. No.: 14/163,738

(22) Filed: Jan. 24, 2014

(65) Prior Publication Data

US 2015/0210114 A1    Jul. 30, 2015

(51) Int. Cl.
B60B 33/00 (2006.01)

(52) U.S. Cl.
CPC ............. *B60B 33/0092* (2013.01); *B60B 33/00* (2013.01); *B60B 33/0018* (2013.01); *B60B 33/0068* (2013.01); *B60B 33/0076* (2013.01); *B60B 33/0078* (2013.01); *B60B 33/0081* (2013.01); *B60B 33/0086* (2013.01); *B60B 33/0089* (2013.01); *Y10T 16/18* (2015.01); *Y10T 16/191* (2015.01); *Y10T 16/195* (2015.01)

(58) Field of Classification Search
CPC  B60B 33/00; B60B 33/0018; B60B 33/0068; B60B 33/0076; B60B 33/0078; B60B 33/0081; B60B 33/0086; B60B 33/0089; B60B 33/0092; Y10T 16/18; Y10T 16/184; Y10T 16/1857; Y10T 16/186; Y10T 16/1853; Y10T 16/191; Y10T 16/195
See application file for complete search history.

(56) References Cited

U.S. PATENT DOCUMENTS

| 743,552 A | * | 11/1903 | Owens | ............................. 16/48 |
| 3,828,392 A | * | 8/1974 | Bolger | .......................... 16/35 R |

(Continued)

OTHER PUBLICATIONS

The Revvo Caster Company, Inc., Medium-Duty Casters, ET Series, Revvo Casters and Wheels Master Catalog, Catalog Sheets, downloaded Dec. 31, 2013, http://www.revvocaster.com/images/revvo_caster_pdfs/Revvo%20ET%20Series.pdf (2 pages).

(Continued)

*Primary Examiner* — Jeffrey O Brien
(74) *Attorney, Agent, or Firm* — Wood, Herron & Evans, LLP

(57) ABSTRACT

A caster wheel braking system for braking rotation of a caster wheel includes a caster having a caster plate, a horn base coupled with the caster plate and rotatable about a vertical axis, a pair of legs extending downwardly from the horn base, and at least one caster wheel coupled with the pair of legs and rotatable about a horizontal axis defined by a wheel axle. A mounting plate is spaced from the caster by a spacer. A movable plunger is disposed between the caster plate and the mounting plate and is horizontally movable through a slot provided in the spacer. A brake shoe is vertically movable by the movable plunger between a non-braking position in which the at least one caster wheel is permitted to rotate and a braking position in which the brake shoe exerts a braking force on the at least one caster wheel to at least partially hinder rotation of the at least one caster wheel. A pin may be coupled with the movable plunger and be configured to convert horizontal movement of the movable plunger to vertical movement of the brake shoe. Additionally, a biasing element may be provided adjacent to the brake shoe and be configured to bias the brake shoe toward the non-braking position or the braking position. One or more of the caster wheel braking systems may be provided on a transport vehicle configured to move along a ground surface.

20 Claims, 20 Drawing Sheets

(56) References Cited

U.S. PATENT DOCUMENTS

| | | | |
|---|---|---|---|
| 4,720,893 | A | 1/1988 | Mellwig et al. |
| 5,115,539 | A | 5/1992 | Lee |
| 5,617,934 | A * | 4/1997 | Yang .......................... 188/1.12 |
| 6,298,950 | B1 | 10/2001 | Oelrichs et al. |
| 6,865,775 | B2 | 3/2005 | Ganance |
| 7,017,228 | B2 | 3/2006 | Silverstein et al. |
| 7,200,894 | B2 | 4/2007 | Block et al. |
| 7,228,936 | B2 | 6/2007 | Wyse et al. |
| 7,712,184 | B1 | 5/2010 | Lewis et al. |
| 7,950,108 | B2 * | 5/2011 | Yang et al. .......................... 16/47 |
| 8,418,315 | B1 * | 4/2013 | Lin et al. ...................... 16/35 R |
| 8,517,399 | B2 | 8/2013 | Liu |
| 2002/0004968 | A1 * | 1/2002 | Yeh ................................. 16/48 |
| 2007/0289098 | A1 * | 12/2007 | Tsai .............................. 16/35 R |
| 2010/0107361 | A1 * | 5/2010 | Yang et al. .......................... 16/47 |
| 2010/0122430 | A1 * | 5/2010 | Ahn et al. .......................... 16/37 |
| 2011/0069820 | A1 | 3/2011 | Hartwich et al. |
| 2013/0111664 | A1 * | 5/2013 | Childs et al. ...................... 5/600 |
| 2013/0174375 | A1 * | 7/2013 | Lin et al. ........................... 16/47 |
| 2013/0174377 | A1 * | 7/2013 | Lin et al. ....................... 16/35 R |
| 2013/0194072 | A1 * | 8/2013 | Kim et al. ...................... 340/6.1 |
| 2013/0212834 | A1 * | 8/2013 | Chen ................................ 16/45 |
| 2014/0238784 | A1 * | 8/2014 | Yeo .............................. 188/1.12 |

OTHER PUBLICATIONS

Fixed Position Brake Caster from Revvo, published Oct. 5, 2012, accessed Aug. 18, 2014, http://www.pddnet.com/product-releases/2012/10/fixed-position-brake-caster-revvo (2 pages).

Caster Connection, Blickle®, CC Apex, downloaded Dec. 31, 2013, (web address no longer available) (1 page).

Blickle®, Product Data Sheet, LH-SETH 200K-IS, copyright 2013, downloaded Aug. 18, 2014, http://www.blickle.us.com/ae/heavyduty-wheels-polyurethane-extrathane-us/products-us/LH-SETH-200K-IS.pdf (2 pages).

* cited by examiner

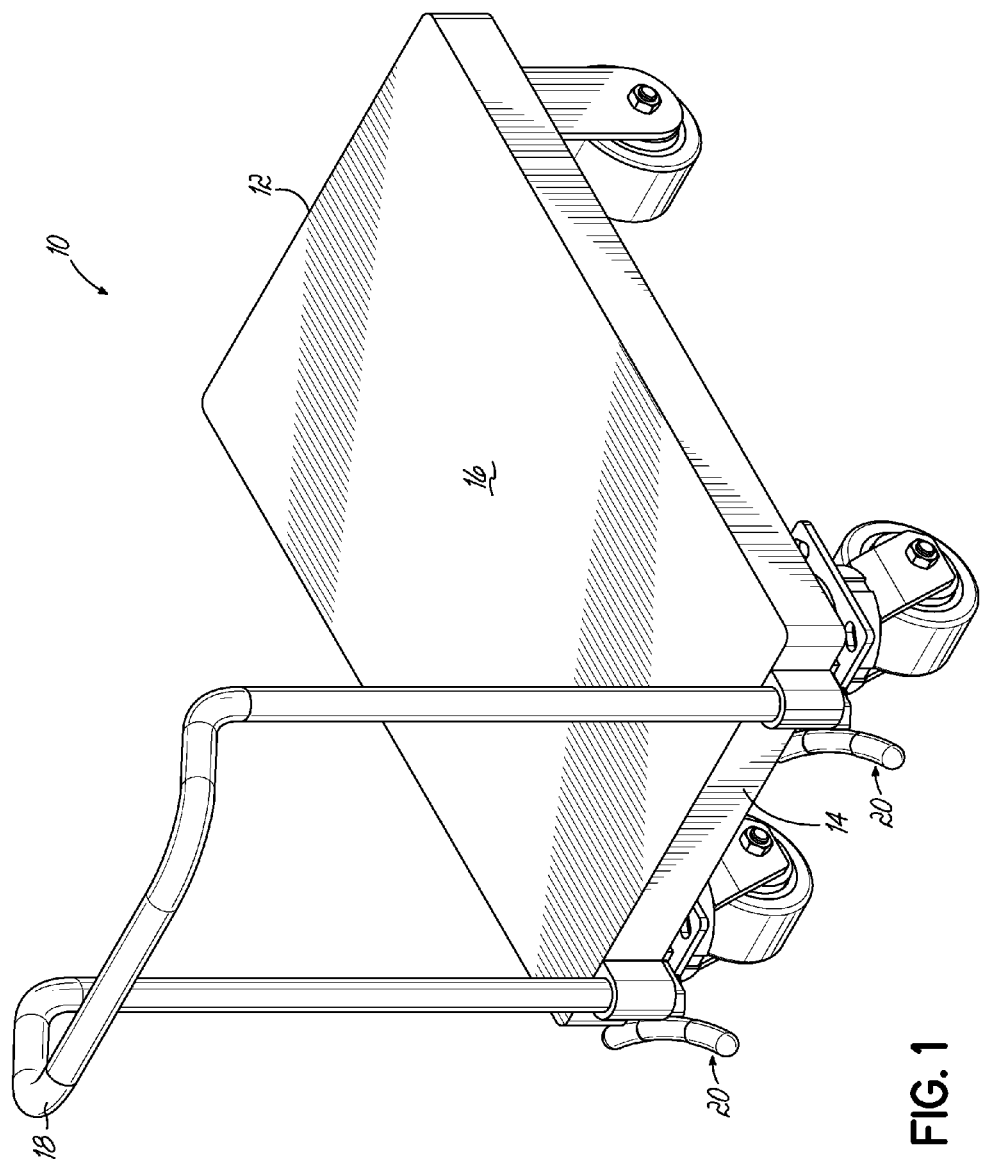

CASTER WHEEL BRAKING SYSTEMS

TECHNICAL FIELD

The present invention relates generally to casters. More particularly, the invention relates to systems for braking the rotation of a caster wheel.

BACKGROUND

Casters are commonly attached to transport vehicles, such as carts, trailers, trucks, or dollies, and allow for rolling movement of the transport vehicle along a ground surface. Casters generally include a horn, also referred to as a yoke, having a pair of legs that extend downwardly and support a caster wheel that rolls along the ground surface. Casters may be classified as light-duty or heavy-duty, stem-style or plate-style, swivel or rigid, and kingpin or kingpinless, for example.

A caster is considered light-duty or heavy-duty depending generally on the magnitude of the load it is designed to support with a caster wheel. Caster wheels come in a large variety of sizes, measured both by the width of the wheel tread and by its diameter. Heavy-duty casters are generally fitted with larger diameter wheels and wider tread widths than lighter duty casters. Household furniture normally features lighter duty casters, with smaller and narrower wheels. In industrial applications, vehicles designed for transporting heavy loads feature heavy-duty casters with wider and larger diameter wheels.

Casters are generally attached to the support vehicle by either a stem or a mounting plate. Stem casters include a vertical stem, or stud, that extends upwardly from the horn and is configured to attach the caster to a vehicle. The stem is inserted into a hole or channel provided on the vehicle, such as an office chair or other furniture. In contrast, plate casters include a caster mounting plate for attaching the caster to a surface, such as a bottom surface, of the transport vehicle. Plate casters are generally used for heavy-duty applications, while stem casters are more common for light-duty applications.

Casters may be permitted to rotate about their vertical axis (termed "swivel"), or they may be fixed or restricted (termed "rigid"). Swivel casters include a horn base that is rotatably coupled with the caster mounting plate or stem such that the horn and caster wheel, comprising the lower portion of a mounted caster, may swivel about the vertical axis relative to the caster mounting plate or stem. This swiveling action allows for multi-directional rolling movement, including steering or turning of the transport vehicle. In contrast, rigid casters include a horn that is rigidly attached to the caster mounting plate, such that the horn and swivel caster wheel are fixed relative to the caster mounting plate and do not rotate about the vertical axis. Transport vehicles may be fitted with one or more swivel casters and one or more rigid casters depending on the application and transport design.

Swivel casters are generally of two designs: kingpin and kingpinless. Kingpin casters are the more traditional design and include a threaded stud or bolt, referred to as a kingpin, which extends downwardly from the caster mounting plate and is insertable into a concentric hole provided on the caster horn. A nut is threaded onto the kingpin and is tightened to couple the horn to the caster mounting plate with one or more bearings between the plate and horn to allow for swiveling movement. Swivel resistance is dependent on design and fit of mating parts, bearing types, and sometimes the tightness of the nut. Kingpinless casters essentially feature a much larger diameter kingpin, and the major parts are secured by ball bearings which also permit the rotational action. The larger kingpin in the kingpinless design provides access to the top of the caster wheel through the center of the caster mounting plate, made possible by the absence of a vertical stud or bolt within the caster structure.

Transport vehicles often include swivel casters for maneuverability, for example for steering and turning the vehicle. Most transport vehicles having mounted casters include swivel casters on the operator-end of the vehicle, which is the vehicle end on which the operator pushes or pulls to move the vehicle. This operator-end generally also features a handle on which the operator may exert a pushing or pulling force for moving the vehicle. A common caster arrangement for a transport vehicle features swivel casters provided on the operator-end of the vehicle having the handle, and rigid casters provided on the vehicle end opposite the operator-end. For maximum maneuverability, a vehicle may have only swivel casters. An example of this is a common furniture dolly. Such an arrangement provides the advantage of easy maneuverability in tight spaces. However, this arrangement presents a drawback of making consistent directional control difficult along a long, straight path. To provide both tight space maneuverability and easy directional control along longer paths, swivel casters included on the vehicle may be equipped with swivel locks. Swivel locks may be engaged to prevent the caster from swiveling, thereby allowing the swivel caster to function as a rigid caster. Swivel locks may be disengaged to allow swiveling when maximum maneuverability is desired.

During use of the transport vehicle it is often desirable to brake rotation of the caster wheels, including those of any swivel casters. For example, during vehicle loading or unloading, or when parked, the operator may desire that the transport vehicle remain stationary. Accordingly, a caster may incorporate a braking system which may be engaged to apply a braking force to the caster wheel that prevents or significantly hinders rotation of the caster wheel depending on any external forces acting against the braking force, such as a horizontal pushing or pulling force on the vehicle. Traditional braking systems include a brake actuating lever or handle which may be moved by the operator's foot or hand to engage the brake. On swivel casters, the lever or handle is traditionally mounted to the rotatable horn and thus swivels with the horn relative to the caster mounting plate. In use, the horn may swivel to a position in which the brake actuating lever or handle is positioned beneath the vehicle or otherwise beyond the convenient reach of the operator. To engage the brake, the operator must then manually position the caster to reach the brake lever or handle, or adjust the vehicle to accomplish this. This activity is both inconvenient and ergonomically challenging for the operator, who may be bending over to reach the lever while simultaneously attempting to steady the vehicle or secure the load.

Accordingly, there is a need for a caster wheel braking system that addresses the challenges and drawbacks associated with swivel casters as presented above.

SUMMARY

An exemplary embodiment of a caster wheel braking system for braking rotation of a caster wheel includes a caster having a caster plate, a horn base coupled with the caster plate and rotatable about a vertical axis, a pair of legs extending downwardly from the horn base, and at least one caster wheel coupled with the pair of legs and rotatable about a horizontal axis defined by a wheel axle. An upper mounting plate is spaced from the caster by a spacer. A movable plunger is disposed between the caster plate and the upper mounting plate and is horizontally movable through a slot provided in the spacer. A brake shoe is vertically movable by the movable plunger between a non-braking position in which the at least one caster wheel is permitted to rotate and a braking position in which the brake shoe exerts a braking force on the at least one caster wheel to at least partially hinder rotation of the at least one caster wheel. A pin is coupled with the movable plunger and is configured to convert horizontal movement of the movable plunger to vertical movement of the brake shoe.

Another embodiment of a caster wheel braking system for braking rotation of a caster wheel includes a caster having a caster plate, a horn base coupled with the caster plate and rotatable about a vertical axis, a pair of legs extending downwardly from the horn base, and at least one caster wheel coupled with the pair of legs and rotatable about a horizontal axis defined by a caster wheel axle. A mounting plate is spaced from the caster by a spacer. A movable plunger is disposed between the caster plate and the mounting plate and is horizontally movable through a slot provided in the spacer. A brake shoe is vertically movable by the movable plunger between a non-braking position in which the at least one caster wheel is permitted to rotate and a braking position in which the brake shoe exerts a braking force on the at least one caster wheel to at least partially hinder rotation of the at least one caster wheel. A biasing element is adjacent to the brake shoe and is configured to bias the brake shoe toward the non-braking position or the braking position.

An exemplary embodiment of a transport vehicle configured to move along a ground surface includes at least one caster wheel braking system for braking rotation of a caster wheel. The at least one caster wheel braking system includes a caster coupled with the transport vehicle and having a caster plate, a horn base coupled with the caster plate and rotatable about a vertical axis, a pair of legs extending downwardly from the horn base, and at least one caster wheel coupled with the pair of legs and rotatable about a horizontal axis defined by a caster wheel axle. A mounting plate is spaced from the caster by a spacer. A movable plunger is disposed between the caster plate and the mounting plate and is horizontally movable through a slot provided in the spacer. A brake shoe is vertically movable by the movable plunger between a non-braking position in which the at least one caster wheel is permitted to rotate and a braking position in which the brake shoe exerts a braking force on the at least one caster wheel to at least partially hinder rotation of the at least one caster wheel. A pin is coupled with the movable plunger and is configured to convert horizontal movement of the plunger to vertical movement of the brake shoe.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is an isometric view of a transport vehicle having four casters, wherein two of the casters incorporate a caster wheel braking system for braking rotation of a caster wheel according to one embodiment of the invention in which an actuator includes a brake lever.

DETAILED DESCRIPTION

Figure 1A:
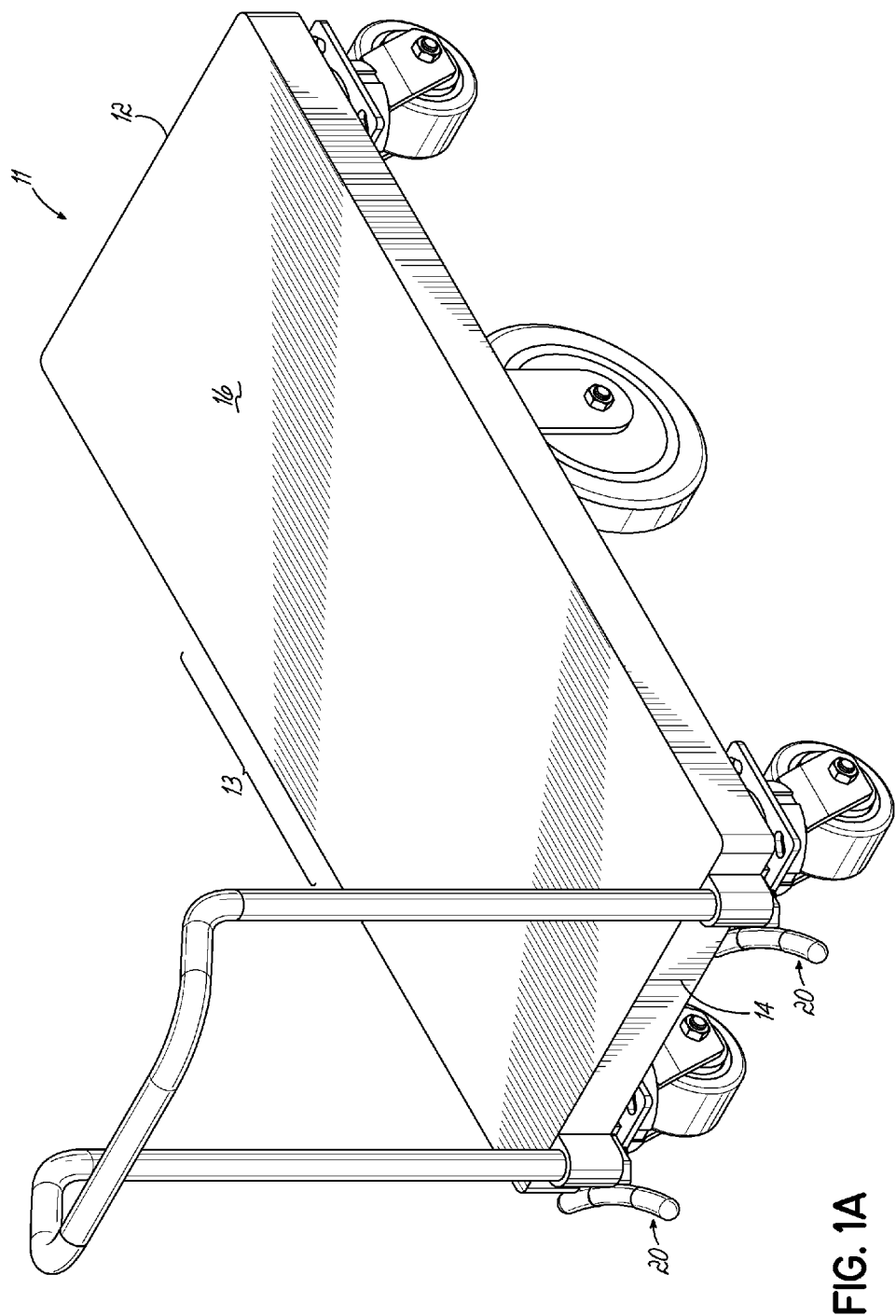
FIG. 1A is an isometric view of a transport vehicle having six casters, wherein two of the casters incorporate the caster wheel braking system shown in FIG. 1 in which the actuator includes a brake lever.

Referring to the figures, and beginning with FIG. 1, a transport vehicle is shown in the form of a platform truck or cart 10 having a front end 12, a rear end 14, a platform 16, and a transport bar 18. The truck or cart 10 is provided at its front end 12 with a pair of rigid casters and at its rear end 14 with a pair of swivel casters, with one of the rigid casters being hidden from view. Each of the swivel casters incorporates an exemplary caster wheel braking system 20 for braking rotation of a caster wheel. The platform 16 is configured to receive a load of one or more objects for transportation by the vehicle. The transport bar 18, as shown, may be in the form of a pipe handle and an operator may exert a pushing or pulling force thereon for moving the vehicle in a desired direction.

While the transport vehicle is shown in the form of platform truck or cart 10 having four casters, the vehicle may be any other suitable transport vehicle configured to include casters for providing rolling movement along a ground surface. For example, FIG. 1A shows a transport vehicle in the form of platform truck or cart 11 having six casters. The front end 12 and rear end 14 of the truck or cart 11 each include two swivel casters, one being hidden from view. A middle portion 13 of the vehicle includes two rigid casters, one being hidden from view.

Although FIGS. 1 and 1A illustrate vehicles 10, 11 having only two swivel casters incorporating the caster wheel braking system 20, in either embodiment shown all of the casters disposed at the front end 12 and rear end 14 of the vehicles 10, 11 may incorporate the caster wheel braking system 20, or any other caster wheel braking system described herein.

Figure 2:
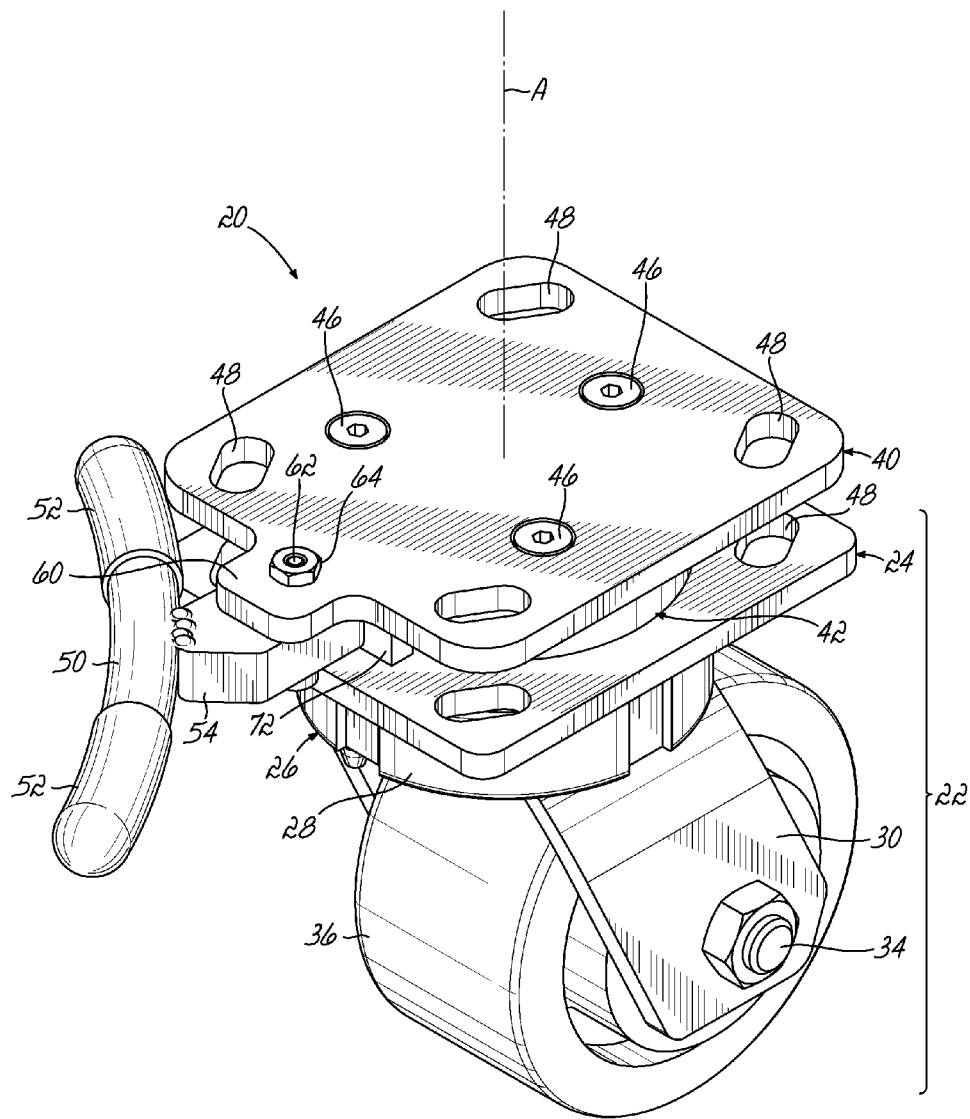
FIG. 2 is an isometric view of the braking system shown in FIG. 1 in which the actuator includes a brake lever.
Figure 3:
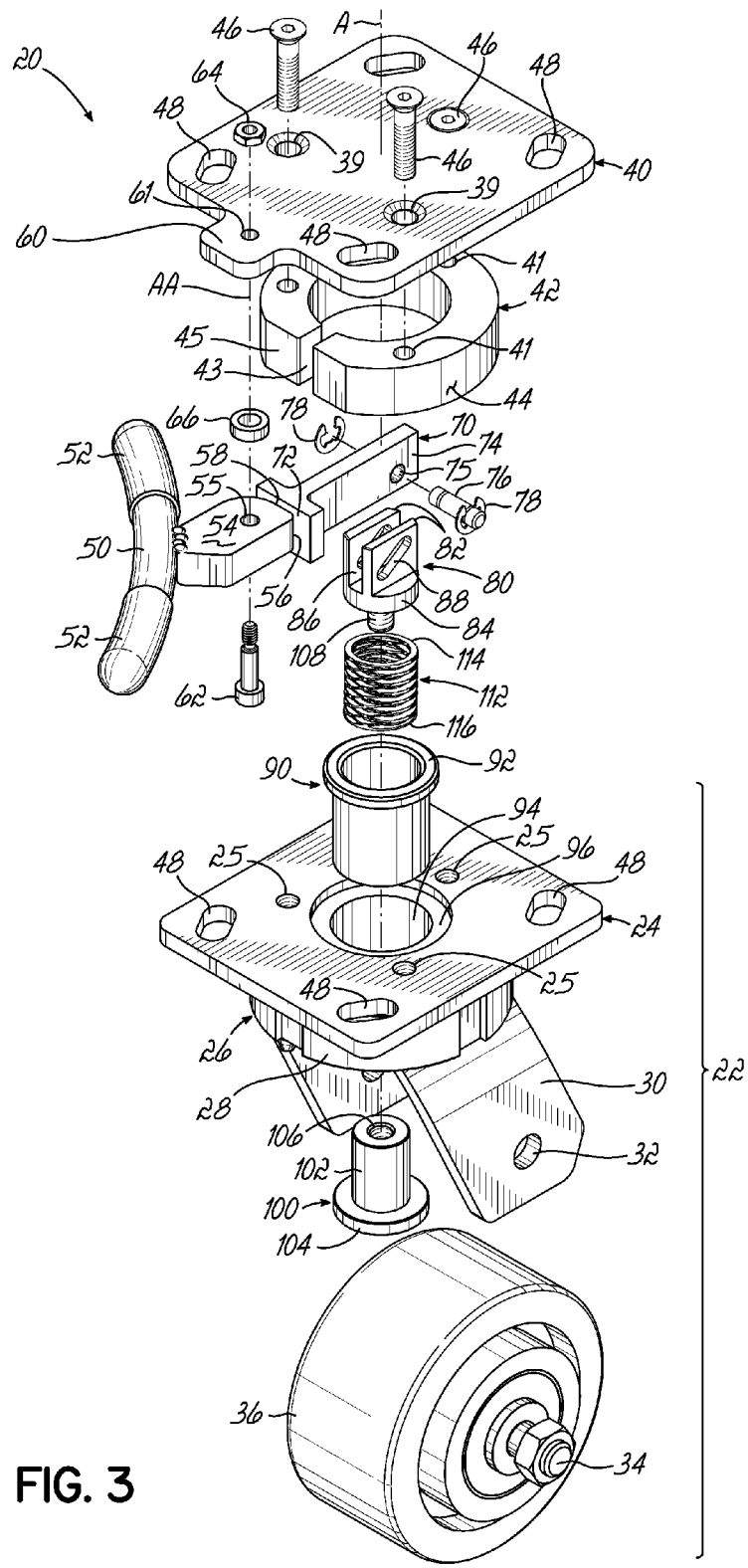
FIG. 3 is a partially disassembled view of the braking system of FIG. 2.

Referring to FIGS. 2 and 3, an exemplary embodiment of the braking system 20 includes a caster 22, shown and described herein as a heavy-duty, kingpinless, swivel caster. Persons skilled in the art will appreciate that the caster wheel braking systems disclosed herein may be adapted for other style casters as well.

The caster 22 includes a caster plate 24 and a horn 26, also referred to as a yoke, having a horn base 28 that is rotatably coupled with the caster plate 24 such that the horn 26 may swivel relative to the caster plate 24 about a vertically oriented central axis A. The caster 22 is provided with a load bearing (not shown) which operates to enable the swiveling movement. The load bearing may include an outer bearing ring defined by or formed with the horn base 28 and having an outer ballrace facing radially inward, an inner bearing ring formed with a lower surface of the caster plate 24 and having an inner ballrace facing radially outward, and a plurality of movable bearing balls disposed between the inner ballrace and the outer ballrace.

Figure 2A:
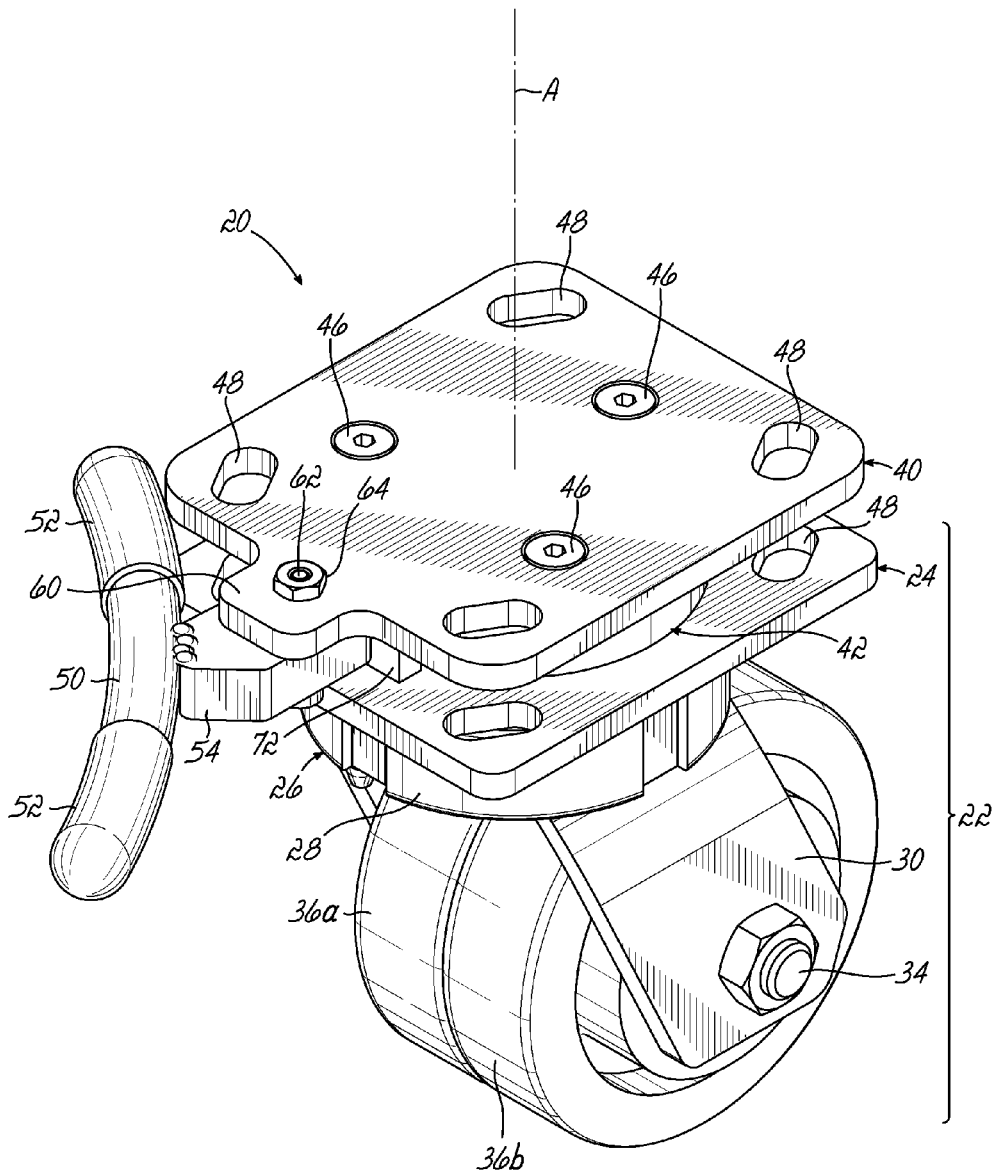
FIG. 2A is an isometric view of the braking system of FIG. 2, wherein the caster includes dual caster wheels.

The horn 26 further includes a pair of legs 30 that are securely attached, for example by welds, to the horn base 28. The legs 30 extend downwardly from the horn base 28 and the caster plate 24, and the legs 30 include a pair of opposed axle holes 32 for supporting a wheel axle 34 and caster wheel 36. The caster wheel 36 is rotatably coupled with the wheel axle 34 such that it may rotate about the wheel axle 34 to permit rolling movement of the caster 22 and the transport vehicle to which it is attached. The caster wheel 36 may be of any size, shape, and material suitable for the application and the environment in which the caster 22 is operated. Suitable materials for the wheel 36 may include any metals or polymers of varying hardness, including plastics, polyurethanes, and rubbers. For example, the wheel 36 may include a cast iron center portion and a polyurethane tread applied to the outer circumference of the center portion. Additionally, the caster 22 of braking system 20, or of any other braking system disclosed herein, may be provided with multiple caster wheels. For example, as shown in FIG. 2A, the caster 22 may be provided with dual caster wheels 36a and 36b in a side-by-side, parallel arrangement. Like the single caster wheel 36, the dual caster wheels 36a, 36b may be of any size, shape, and material suitable for the application and the environment in which the caster 22 is operated.

In addition to the caster 22, the braking system 20 shown in FIGS. 2 and 3 further includes an upper mounting plate 40 that is disposed vertically above and substantially parallel to the caster plate 24. The upper mounting plate 40 and caster plate 24 are spaced apart in a vertical direction by a spacer 42, the structural details of which are discussed below. The caster plate 24, spacer 42, and upper mounting plate 40 are coupled together by any suitable mechanical means, such as by threaded screws, weldment, or integral formation through machining or forging. For example, as shown, threaded screws 46 may be inserted downwardly through throughholes 39 and 41 provided in the upper mounting plate 40 and in the spacer 42 respectively, and into threaded holes 25 provided in the caster plate 24. The through-holes 39 provided in the upper mounting plate 40 may include countersinks to facilitate insertion of the screws 46 during assembly and allow the heads of screws 46 to lie flush with a top surface of the upper mounting plate 40. Each threaded hole 25 in the caster plate 24 is coaxially aligned with the corresponding through-holes 39, 41 in the spacer 42 and the upper mounting plate 40. Additionally, each threaded hole 25 preferably extends only partially through a thickness of the caster plate 24, such that the screw 46 inserted therein is prevented from extending fully through the thickness of the caster plate 24.

The caster plate 24 and/or upper mounting plate 40 may include a plurality of mounting slots 48 for mounting the caster 22 to a transport vehicle. Each mounting slot 48 is preferably configured to receive a bolt or other mechanical fastener (not shown) therethrough for securing the caster 22 to the transport vehicle. In other embodiments, the mounting slots 48 may be omitted from either or both of the caster plate 24 and upper mounting plate 40. For example, the caster 22 may be welded onto the transport vehicle, in which case mounting slots may not be necessary and thus not included on either of the caster plate 24 or the upper mounting plate 40.

The braking system 20 further includes an actuator in the form of a horizontally oriented brake lever 50, which may have grips 52. The grips 52 are configured to slip over the ends of the brake lever 50 and provide a frictional surface to thereby improve the ability of an operator to grip and manipulate the brake lever 50 with a foot or hand. The grips 52 may be of any ergonomic design and of any suitable material, such as rubber or plastic. If desired, the grips 52 may be omitted from the brake lever 50. A horizontally oriented cam 54 is securely attached to the brake lever 50 and has a cam nose 56 and a generally flat cam contact face 58. For example, as shown, the cam 54 may be welded to a middle portion of the brake lever 50. As shown, the brake lever 50 may be a curved bar having a circular cross-section and two opposed ends spanning across a horizontal plane. The brake lever 50 thus provides a structure that allows an operator to effectively manipulate the brake lever 50 with his or her foot or hand. Although a curved bar having a circular cross-section is shown, the brake lever 50 may have any other suitable shape, cross-section, or curvature.

The cam 54 is rotatably coupled with the upper mounting plate 40 such that the brake lever 50 and cam 54 are rotatable in a horizontal plane about a vertical axis AA, as best seen in FIG. 3. The brake lever 50 thus avoids interfering with the upper mounting plate 40, adjacent surfaces of the transport vehicle, or the ground surface when the caster 22 includes a caster wheel 36 having a small diameter. Specifically, as shown, the cam 54 is provided with a vertical through-hole 55 that is coaxially aligned with a corresponding through-hole 61 on a tab 60 of the upper mounting plate 40. A shoulder screw 62 may be inserted upwardly through the through-holes 55, 61 respectively and be fitted with a nut 64 at an opposing face of the tab 60 for coupling the cam 54 with the upper mounting plate 40. The brake lever 50 and cam 54 are thereby rotatable about the vertical axis AA defined by the shoulder screw 62. The shoulder screw 62 preferably includes a washer 66 for reducing friction and facilitating rotational movement, the washer 66 being positioned between an upper surface of the cam 54 and a lower surface of the upper mounting plate 40. Alternatively, the cam 54 may be coupled with the upper mounting plate 40 by a clevis pin, a rivet, or any other suitable mechanical fastener that all allows for rotational movement of the cam 54 while providing a strong mechanical coupling.

While the actuator of the braking system 20 is shown and described herein as including the brake lever 50 and cam 54, the actuator may include any other suitable pneumatic, hydraulic, or electrical device provided in lieu of or in combination with the brake lever 50 and cam 54.

A movable plunger 70 is disposed between the upper mounting plate 40 and the caster plate 24, and is in operable engagement with and horizontally movable by the cam 54. The movable plunger 70 is slidable through a spacer slot 43 in the spacer 42 toward and away from the central axis A. As best shown in FIG. 3, the movable plunger 70 is substantially T-shaped and includes a plunger contact face 72 formed integrally and substantially perpendicularly with a plunger arm 74. The plunger contact face 72 operates to follow the cam 54 and is configured to abut and receive a horizontal compression force that is transferred from the cam nose 56 and the cam contact face 58 upon movement of the cam 54. In this manner, rotational movement of the cam 54 causes horizontal translational movement of the movable plunger 70. The plunger arm 74 includes a horizontal through-hole 75 that is sized to receive a clevis pin 76 with a slip fit such that the clevis pin 76 may easily rotate within the through-hole 75. The clevis pin 76 may include a groove at each of its opposed ends for receiving a retaining clip 78.

The spacer 42 has a generally annular shape and includes a spacer slot 43 that extends through a radial thickness of the spacer 42 and is sized and shaped to slidably receive the plunger arm 74 therethrough. Thus, the plunger arm 74 is slidable toward and away from the central axis A in a radial direction through the spacer slot 43. Material may be removed from an outer surface 44 of the spacer 42 to form a flat face 45 that is positioned radially inward of a plane (not shown) tangent to the outer surface 44. The flat face 45 thus permits the movable plunger 70 to translate radially inward toward the central axis A without interfering with the outer surface 44 of the spacer 42.

An adapter 80 is movably coupled with the movable plunger 70, by the clevis pin 76, and is vertically oriented within a bushing 90. The bushing 90 is generally cylindrical and is positioned within a central aperture 94 that extends vertically through the caster 22 along the central axis A. Specifically, the central aperture 94 extends vertically through the caster plate 24 and the horn base 28, and may include a counterbore 96 at the top surface of the caster plate 24 for receiving a bushing flange 92.

The adapter 80 includes two parallel guides 82 that extend vertically upward from an adapter base 84 and are spaced apart to define an adapter channel 86 for receiving the plunger arm 74. Each guide 82 includes an angled slot 88 that is angled relative to a horizontal plane defined by the caster plate 24, for example, and sized to receive the clevis pin 76 therethrough. During assembly, the plunger arm 74 is inserted into the channel 86 so that the horizontal through-hole 75 provided in the plunger arm 74 is aligned with the pair of angled slots 88 on the adapter 80. The clevis pin 76 is then inserted through the two guides 82 and the plunger arm 74 positioned therebetween, and is retained in place with the retaining clips 78.

The angled slots 88, and the clevis pin 76 acting therewith, are configured to convert a horizontal force to a vertical force, and thus horizontal movement to vertical movement. Specifically, the cam 54 exerts a horizontal compression force on the movable plunger 70, which in turn exerts a horizontal compression force on the adapter 80 through the clevis pin 76. The angled slots 88 on the adapter 80 receive this horizontal compression force from the clevis pin 76 and convert it to a vertical compression force. This vertical compression force causes the adapter 80, and a brake shoe 100 coupled therewith, to move vertically downward along the central axis A through the bushing 90. The brake shoe 100 thereby exerts a downward braking force on the caster wheel 36, as described in greater detail below. In this manner, rotational movement of the cam 54 causes horizontal translational movement of the movable plunger 70 and clevis pin 76, which in turn causes vertical translational movement of the adapter 80 and brake shoe 100.

The angled slots 88 are formed with a slot angle defined by a center line (not shown) along a length of each slot 88, measured relative to a horizontal plane. This slot angle defines a horizontal-to-vertical stroke ratio corresponding to the horizontal movement of the movable plunger 70 and clevis pin 76 and the vertical movement of the adapter 80. The angled slots 88 may be formed with a slot angle to provide a horizontal-to-vertical stroke ratio of 2:1, for example. Furthermore, the slot angle directly affects the magnitude of the downward braking force exerted by the brake shoe 100 on the caster wheel 36. For reference, one may consider the braking force exerted by the brake shoe 100 when the angled slots 88 are formed with a slot angle of forty-five degrees. When the angled slots 88 are formed with a steeper slot angle, for example one greater than forty-five degrees but less than ninety degrees, the downward braking force exerted on the wheel 36 decreases. Similarly, when the angled slots 88 are formed with a shallower slot angle, for example one less than forty-five degrees but greater than zero degrees, the downward braking force exerted on the wheel 36 increases. In this manner, the angled slots 88 may be formed with any suitable slot angle to provide a desired downward braking force.

The brake shoe 100 is coupled with the adapter 80 and includes a generally cylindrical shaft portion 102 oriented vertically along the central axis A, and a toe 104 extending downwardly from the shaft portion 102. The toe 104 is positioned external to the bushing 90 and adjacent to the caster wheel 36, and may be shaped to generally conform to the outer circumference of the caster wheel 36. For example, as shown in FIGS. 3 and 4A, the brake shoe toe 104 is a disk having a generally truncated conical face. The shaft portion 102 is positioned within the bushing 90 and has a threaded bore 106 that is sized to receive a threaded stud 108 extending downwardly from a lower surface of the adapter base 84. The brake shoe 100 is thus threadedly engaged with the adapter 80 such that a vertical distance between the brake shoe toe 104 and the adapter base 84 is adjustable by rotating the brake shoe 100 in a clockwise or counter-clockwise direction. Adjusting this vertical distance will, in effect, also adjust a vertical distance between the brake shoe 100 and other components of the braking system 20, such as the movable plunger 70, for example. Vertical adjustment of the brake shoe 100 is preferably performed when the brake shoe 100 is in a retracted, non-braking position, described below.

Figure 4:
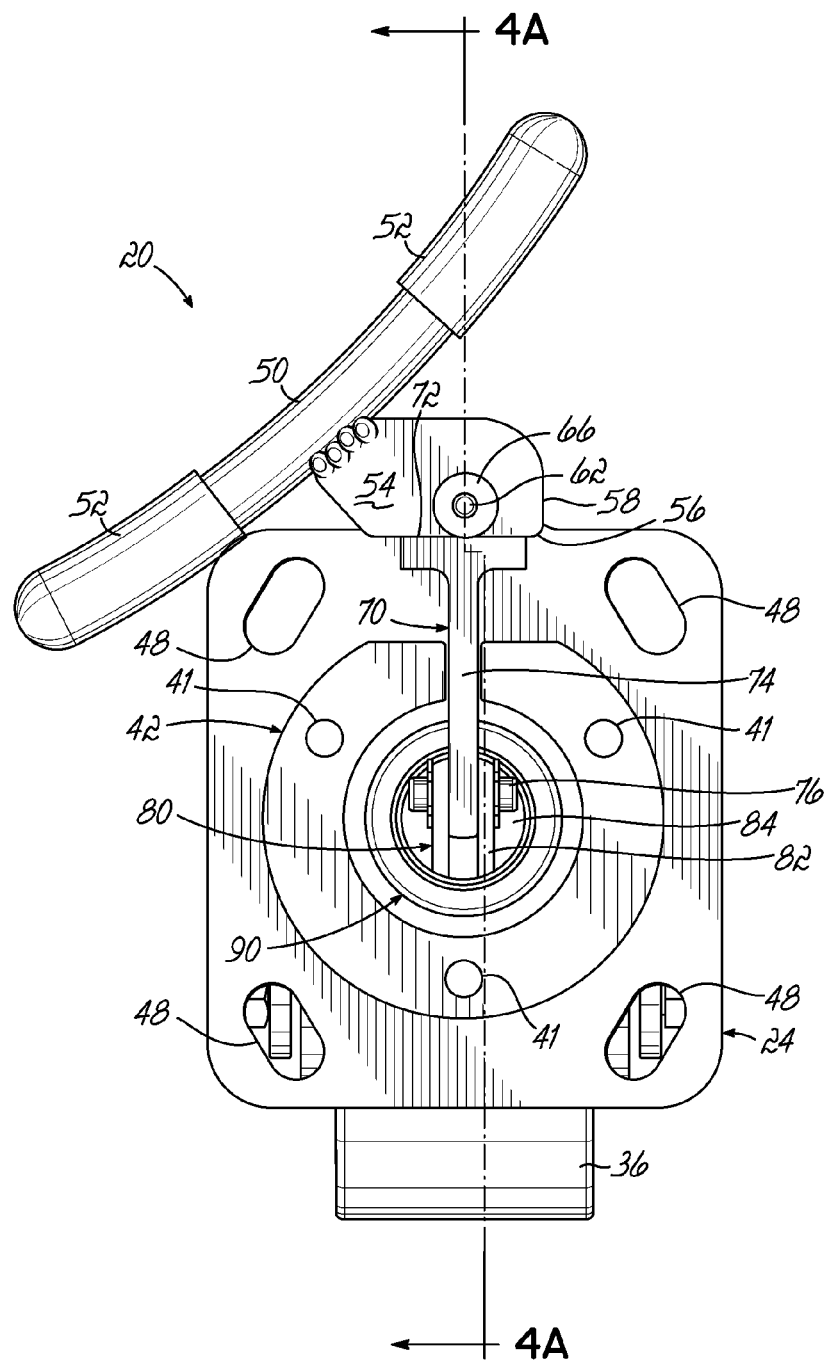
FIG. 4 is a top elevational view of the braking system of FIG. 2, with an upper mounting plate hidden, showing the brake lever in a first brake lever position.
Figure 4A:
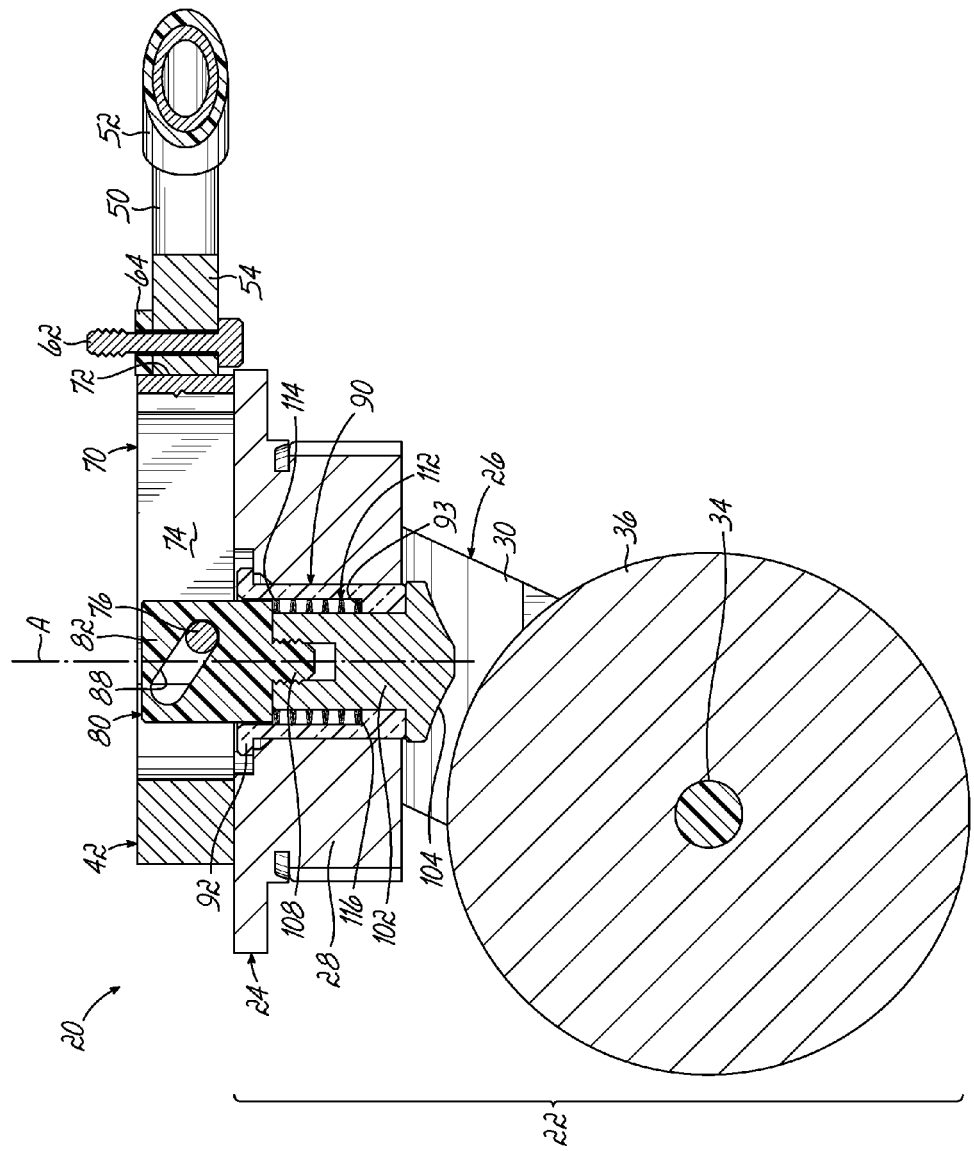
FIG. 4A is a side cross-sectional view of the braking system of FIG. 4, taken along section line 4A-4A, showing a brake shoe in a retracted, non-braking position when the brake lever is in a first brake lever position.
Figure 5:
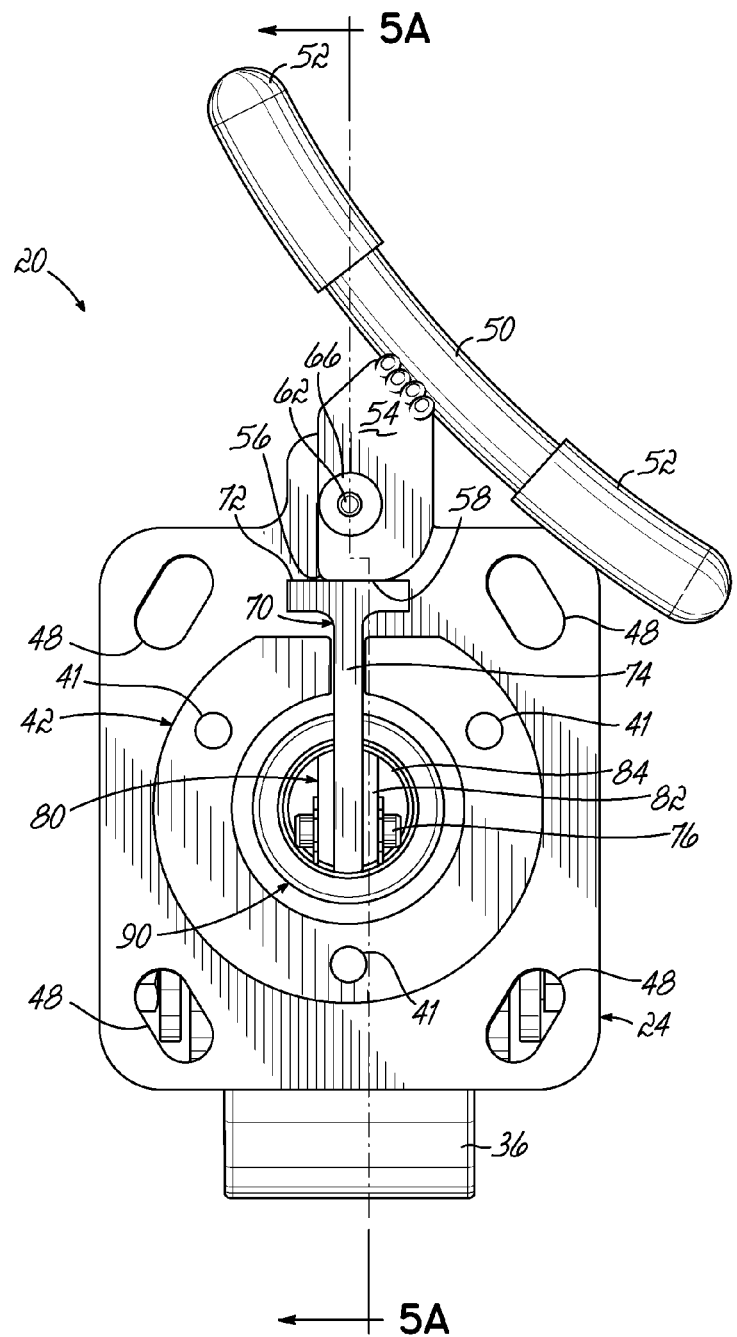
FIG. 5 is a top elevational view of the braking system of FIG. 2, with the upper mounting plate hidden, showing the brake lever in a second brake lever position.
Figure 5A:
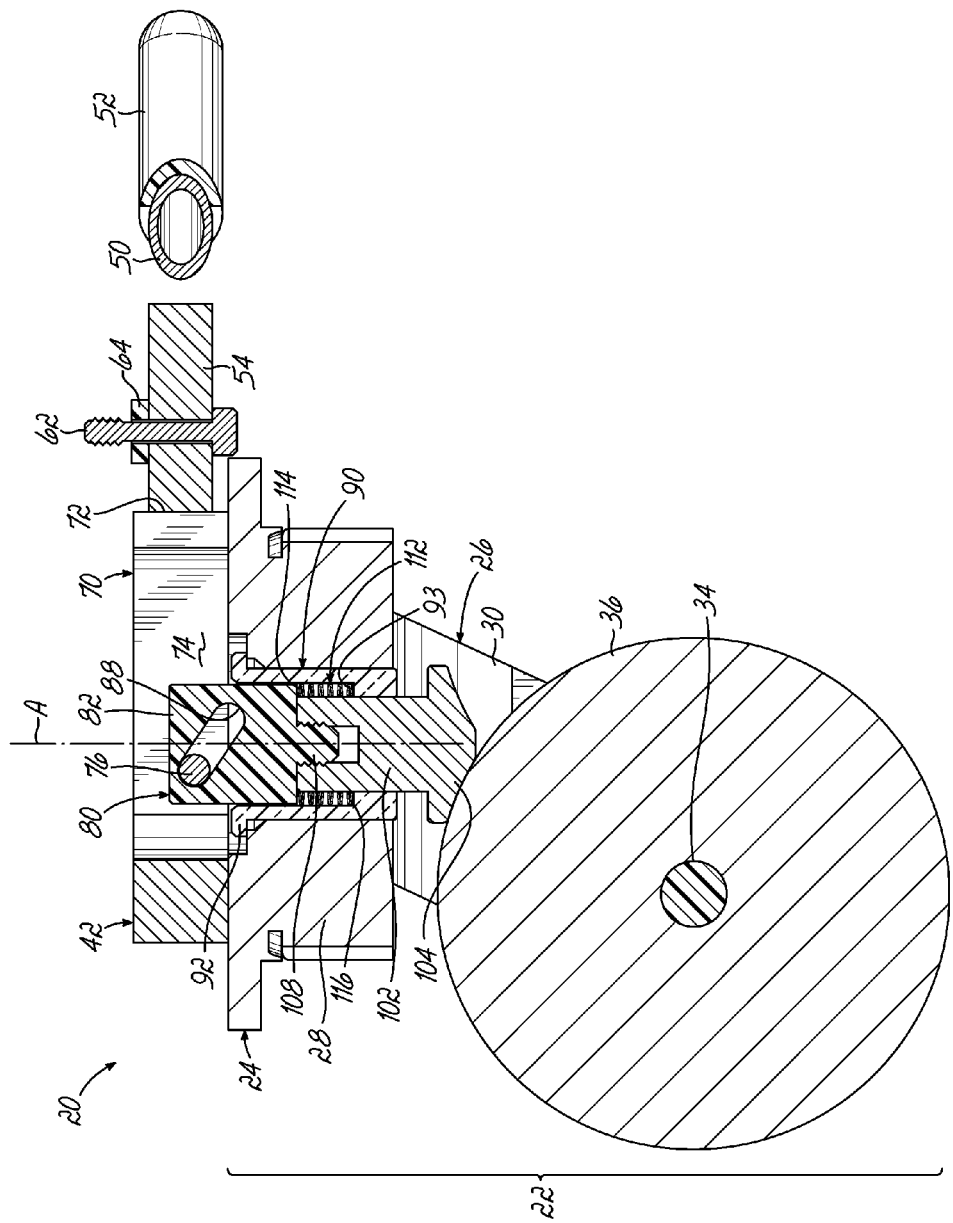
FIG. 5A is a side cross-sectional view of the braking system of FIG. 5, taken along section line 5A-5A, showing the brake shoe in an extended, braking position when the brake lever is in the second brake lever position.

The brake shoe 100 is vertically movable along the central axis A between a retracted, non-braking position shown in FIG. 4A, and an extended, braking position shown in FIG. 5A. In the retracted, non-braking position, the brake shoe toe 104 is spaced apart from the caster wheel 36 such that the wheel 36 is permitted to rotate about the wheel axle 34. In the extended, braking position, the brake shoe toe 104 is in direct contact with the caster wheel 36 and exerts a vertical compression braking force on the wheel 36 to completely block or at least partially hinder rotation of the wheel 36.

The brake shoe 100 may be composed of any material or materials suitable for the application and the environment in which the caster 22 is operated. Suitable materials may include any metal or polymer of varying hardness, including plastics, polyurethanes, and rubbers. For example, the brake shoe 100 may be formed of a metal and may include a polymer coating. The material or materials forming the brake shoe 100 may be selected based at least in part on the material or materials forming the caster wheel 36. For example, the brake shoe 100 may be formed of a metal and the caster wheel 36 may be formed of a polymer or of a metal having a polymer coating in the form of a wheel tread. By way of further example, the caster wheel 36 may be formed of metal and the brake shoe 100 may be formed of a polymer or a metal having a polymer coating.

As shown in FIGS. 4A and 5A, a spring 112, shown as a compression spring, is positioned within the bushing 90 and surrounds a portion of the length of the shaft portion 102 of the brake shoe 100. The spring 112 includes an upper spring end 114 that is positioned adjacent to a lower surface of the adapter base 84, and a lower spring end 116 that is positioned adjacent to an internal base surface 93 of the bushing 90. The brake shoe 100 of the braking system 20 is thereby biased toward the retracted, non-braking position.

FIGS. 4 through 5A show additional detail of the braking system 20 when the brake lever 50 is rotated between first and second brake lever positions to move the brake shoe 100 between the retracted, non-braking position and the extended, braking position.

FIGS. 4 and 4A show respectively a top elevational view, with the upper mounting plate 40 hidden, and a corresponding side cross-sectional view of the braking system 20 in which the brake lever 50 in the first brake lever position. The cam 54 exerts no horizontal force on the movable plunger 70 sufficient to cause inward horizontal movement of the movable plunger 70. In turn, the movable plunger 70 exerts no horizontal force, through the clevis pin 76, on the angled slots 88 of the adapter 80 sufficient to cause downward vertical movement of the adapter 80. In turn, the adapter 80 exerts no vertical force on the brake shoe 100 sufficient to cause downward vertical movement of the brake shoe 100. The spring 112 biases the adapter 80 vertically upward, and the brake shoe 100 coupled with the adapter 80 is thus held in the retracted, non-braking position when the brake lever 50 is in the first brake lever position.

FIGS. 5 and 5A show respectively a top elevational view, with the upper mounting plate 40 removed, and a corresponding side cross-sectional view of the braking system 20 in which the brake lever 50 is rotated to a second brake lever position. During rotation of the brake lever 50 from the first brake lever position, shown in FIGS. 4 and 4A, toward the second brake lever position, shown in FIGS. 5 and 5A, the cam nose 56 first engages and exerts a horizontal force on the plunger contact face 72. As the brake lever 50 is rotated further toward the second brake lever position, the cam contact face 58 next engages and exerts a horizontal force on the plunger contact face 72. The cam contact face 58 and plunger contact face 72 may have complimentary shapes such that the contact faces 58, 72 remain engaged with each other once the brake lever 50 has been fully moved to the second brake lever position. The brake lever 50 is thereby held in the second brake lever position, and the brake shoe 100 is held in the extended, braking position, until the brake lever 50 is rotated back toward the first brake lever position. For example, as shown, the contact faces 58, 72 may have mating surfaces that are generally flat and parallel to one another.

As the brake lever 50 is rotated toward the second brake lever position, the cam 54 exerts a horizontal compression force on the movable plunger 70 sufficient to cause the movable plunger 70 to translate horizontally inward toward the central axis A. In turn, the movable plunger 70 exerts a horizontal compression force, through the clevis pin 76, on the angled slots 88 of the adapter 80. The angled slots 88 convert this horizontal compression force to a vertical compression force sufficient to cause the adapter 80 to translate vertically downward along the central axis A and compress the spring 112. In turn, the adapter 80 exerts a vertical compression force on the brake shoe 100 sufficient to cause the brake shoe 100 to translate vertically downward toward the extended, braking position. As permitted by the interaction between the cam contact face 58 and plunger contact face 72, described above, the brake shoe 100 of the braking system 20 preferably remains in the extended, braking position until the brake lever 50 is rotated back toward the first brake lever position.

Figure 6:
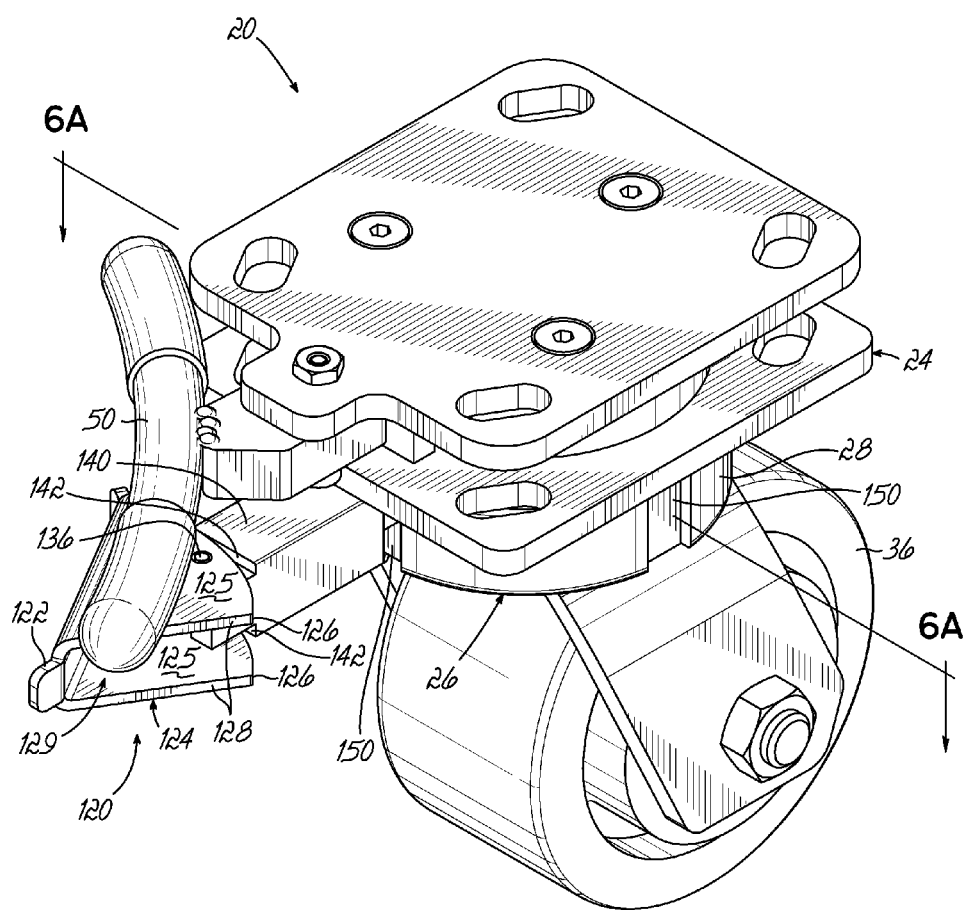
FIG. 6 is an isometric view of the braking system of FIG. 2 in which the caster is provided with a swivel lock, the swivel lock being shown in a locked position.
Figure 7:
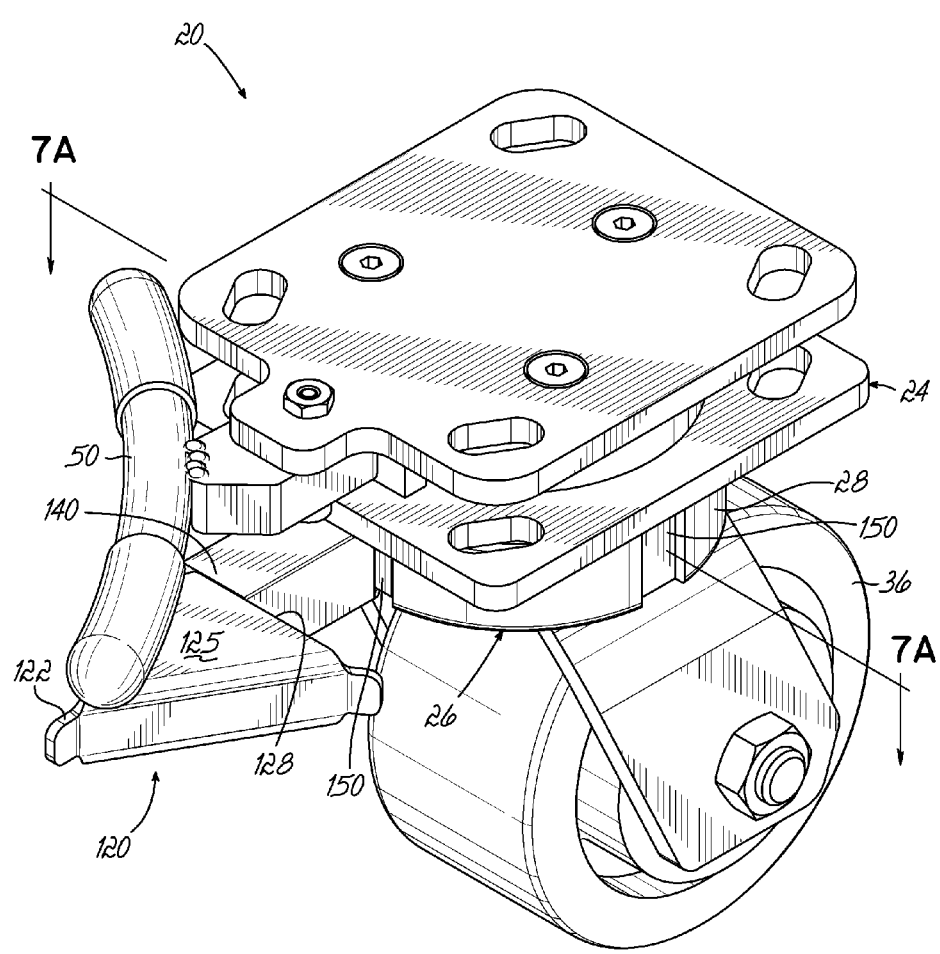
FIG. 7 is an isometric view of the braking system of FIG. 6, showing the swivel lock in an unlocked position.
Figure 7A:
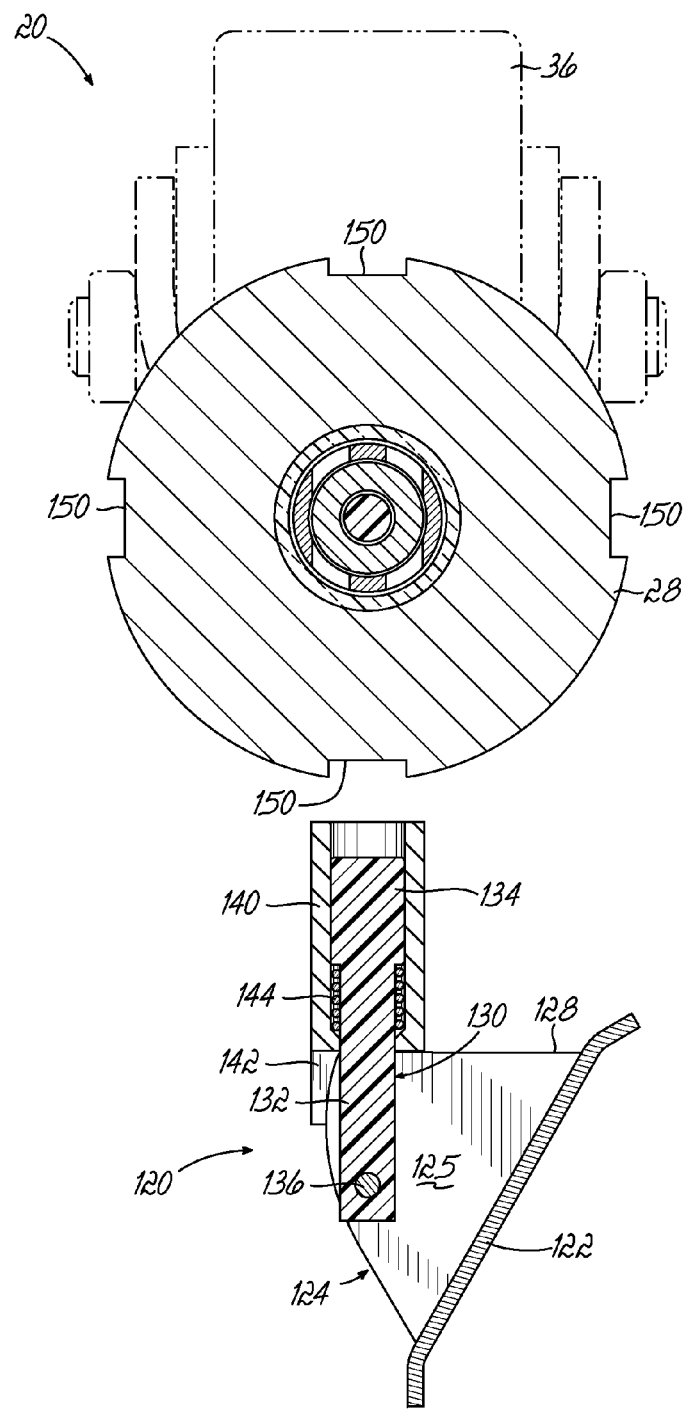
FIG. 7A is a top elevational view of the caster of FIG. 7, taken along section line 7A-7A, showing the swivel lock in the unlocked position.

FIGS. 6 through 7A show another embodiment of the invention in which the braking system 20, as described above, further includes a swivel lock 120. The swivel lock 120 operates to fix the caster horn 26 in a desired rotational position relative to the caster plate 24, and thereby prevent the horn 26 and the caster wheel 36 from swiveling. In essence, the caster 22 is non-permanently converted from a swivel caster to a rigid caster for straight line steering control of the transport vehicle to which the caster 22 is mounted. The swivel lock 120 preferably incorporates a structural design that does not interfere with the brake lever 50 or with any other actuator design described herein.

Figure 6A:
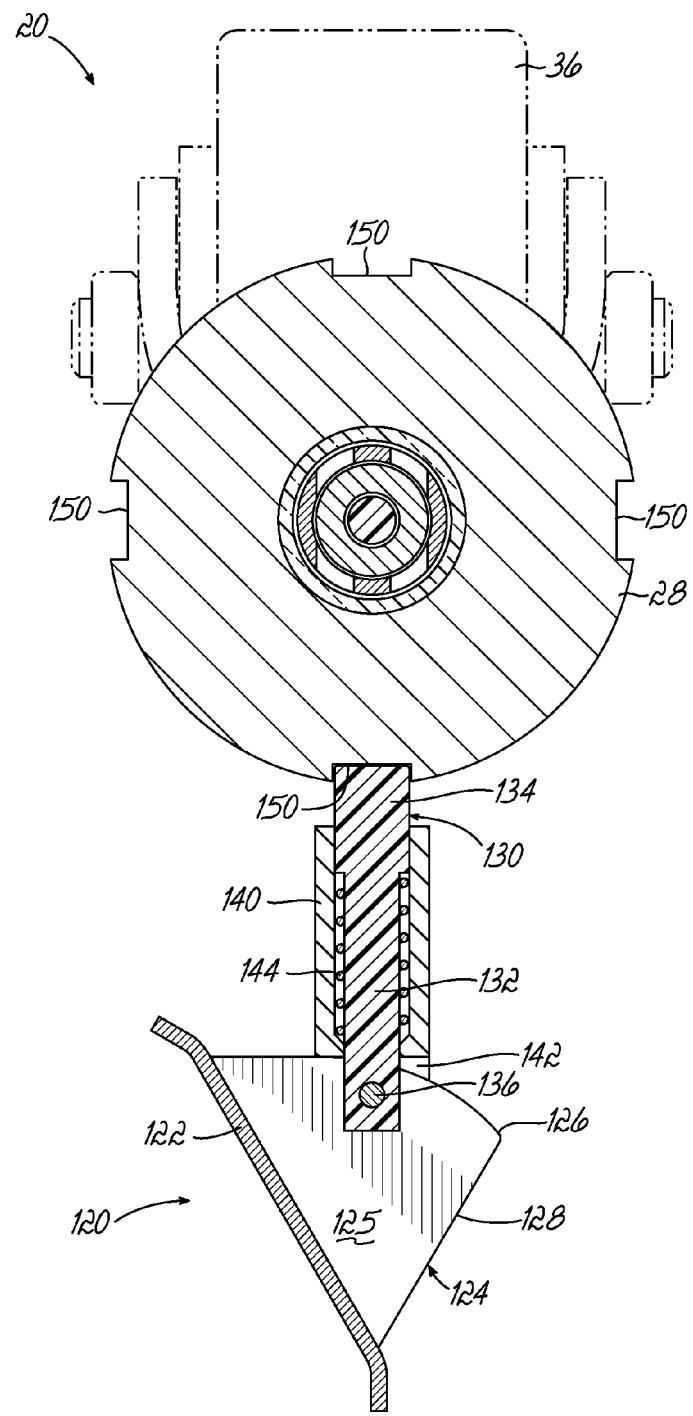
FIG. 6A is top elevational view of the caster of FIG. 6, taken along section line 6A-6A, showing the swivel lock in the locked position.

As shown in FIGS. 6 and 6A, the swivel lock 120 includes a horizontally oriented lock lever 122 that is in operable engagement with and configured to move a movable plunger 130. The lock lever 122 is attached to and may be formed integrally with a lock cam 124. The lock cam 124 includes a pair of cam plates 125 extending horizontally from the lock lever 122, each cam plate 125 having a nose 126 and a cam contact face 128. The cam plates 125 are spaced vertically to define a cam channel 129 therebetween that is sized to receive a shaft portion 132 of the movable plunger 130. The lock cam 124 is rotatably coupled with the movable plunger 130 by a pin 136, such that the lock cam 124 is rotatable about a vertical axis defined by the pin 136.

The swivel lock 120 further includes a housing 140 having a central bore for slidably receiving the movable plunger 130, and two notches 142 for supporting the cam plates 125. The movable plunger 130 is slidable within the housing 140 along a horizontal plane and includes a shaft portion 132 and a locking tip 134 extending from the shaft portion 132. The movable plunger 130 may be generally cylindrical in shape and the shaft portion 132 may have a smaller diameter than the locking tip 134. A spring 144, shown as a compression spring, is positioned within the housing 140 and surrounds the shaft portion 132 such that the spring 144 abuts the locking tip 134 at one end and an internal surface of the housing 140 at the other end.

The swivel lock 120 is mounted to the caster plate 24 such that the locking tip 134 is positioned adjacent to the horn base 28. The horn base 28 includes one or more locking slots 150 spaced about the circumference of the horn base 28 to define various positions in which the horn 26 may be locked to prevent swiveling. For example, as shown, the horn base 28 includes four locking slots 150 spaced at ninety degree intervals about the central axis A, thereby defining four orientations in which the horn 26 maybe locked to prevent swiveling. Each locking slot 150 is sized and shaped to receive the locking tip 134 of the movable plunger 130. For example, as shown, the locking tip 134 is of a generally cylindrical shape and the locking slots 150 are generally rectangular and extend vertically to define a width corresponding to the diameter of the locking tip 134.

As shown by FIGS. 6 through 7A, the movable plunger 130 is movable by the lock cam 124 and lock lever 122 between an extended, locked position in which the horn 26 and caster wheel 36 are prevented from swiveling, and a retracted, unlocked position in which swiveling is enabled. The spring 144 biases the movable plunger 130 toward the extended, locked position.

FIGS. 6 and 6A show respectively an isometric view and a corresponding top cross-sectional view of the caster 22 in which the lock lever 122 is in the first lock lever position. The lock cam 124 exerts no horizontal force on the movable plunger 130 sufficient to cause outward horizontal movement of the movable plunger 130. A spring force provided by the spring 144 holds the movable plunger 130 in the extended, locked position in which the locking tip 134 engages and exerts a horizontal compression force on the locking slot 150 to thereby prevent the horn 26 from swiveling when the lock lever 122 is in the first lock lever position.

FIGS. 7 and 7A show views similar to FIGS. 6 and 6A, but when the lock lever 122 is moved to the second lock lever position. As the lock lever 122 is rotated from the first lock lever position toward the second lock lever position, the lock cam 124 rotates about the pin 136 such that the cam nose 126 of each cam plate 125 first engages and exerts a horizontal compression force on the corresponding notch 142 of the swivel lock housing 140. As the lock lever 122 is rotated further toward the second lock lever position, the cam contact face 128 of each cam plate 125 next engages and exerts a horizontal compression force on the corresponding notch 142. Simultaneously, the lock cam 124 exerts a horizontal tension force on the movable plunger 130 through the pin 136. The movable plunger 130 is thereby drawn horizontally outward toward the retracted, unlocked position in which the spring 144 is compressed and the locking tip 134 is disengaged from the locking slot 150. Swiveling of the horn 26 and caster wheel 36 is thereby enabled. The cam contact faces 128 and notches 142 may have complimentary shapes such that the contact faces 128 and notches 142 remain engaged with each other once the lock lever 122 has been fully moved to the second lock lever position. The lock lever 122 is thereby held in the second lock lever position, and the movable plunger 130 is held in the retracted, unlocked position, until the lock lever 122 is rotated back toward the first lock lever position. For example, as shown, the cam contact faces 128 and notches 142 may have mating surfaces that are generally flat and parallel to one another.

Referring to FIGS. 8 through 12A, another embodiment of the invention is shown in which a braking system 220 provides a "dead man" type brake in which the brake shoe 100 remains in the extended, braking position unless and until an operator applies and continuously maintains a tension force on the braking system 220 to move the brake shoe 100 toward the retracted, non-braking position. The braking system 220 includes the same components as those comprising braking system 20, except as distinguished below.

Figure 8:
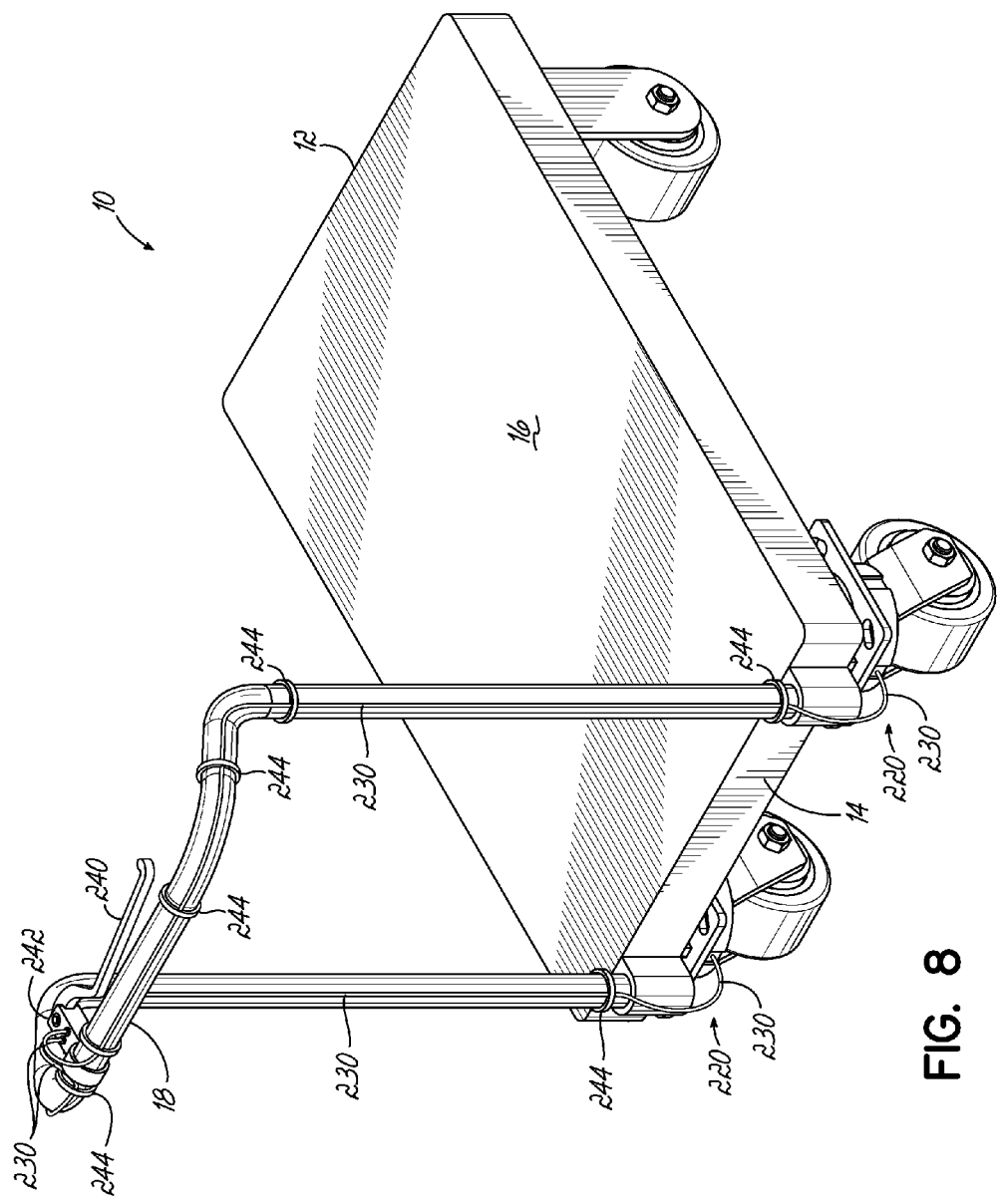
FIG. 8 is an isometric view of a transport vehicle having four casters, wherein two of the casters incorporate a caster wheel braking system for braking rotation of a caster wheel according to another embodiment of the invention in which the actuator includes a control cable and a hand lever.
Figure 9:
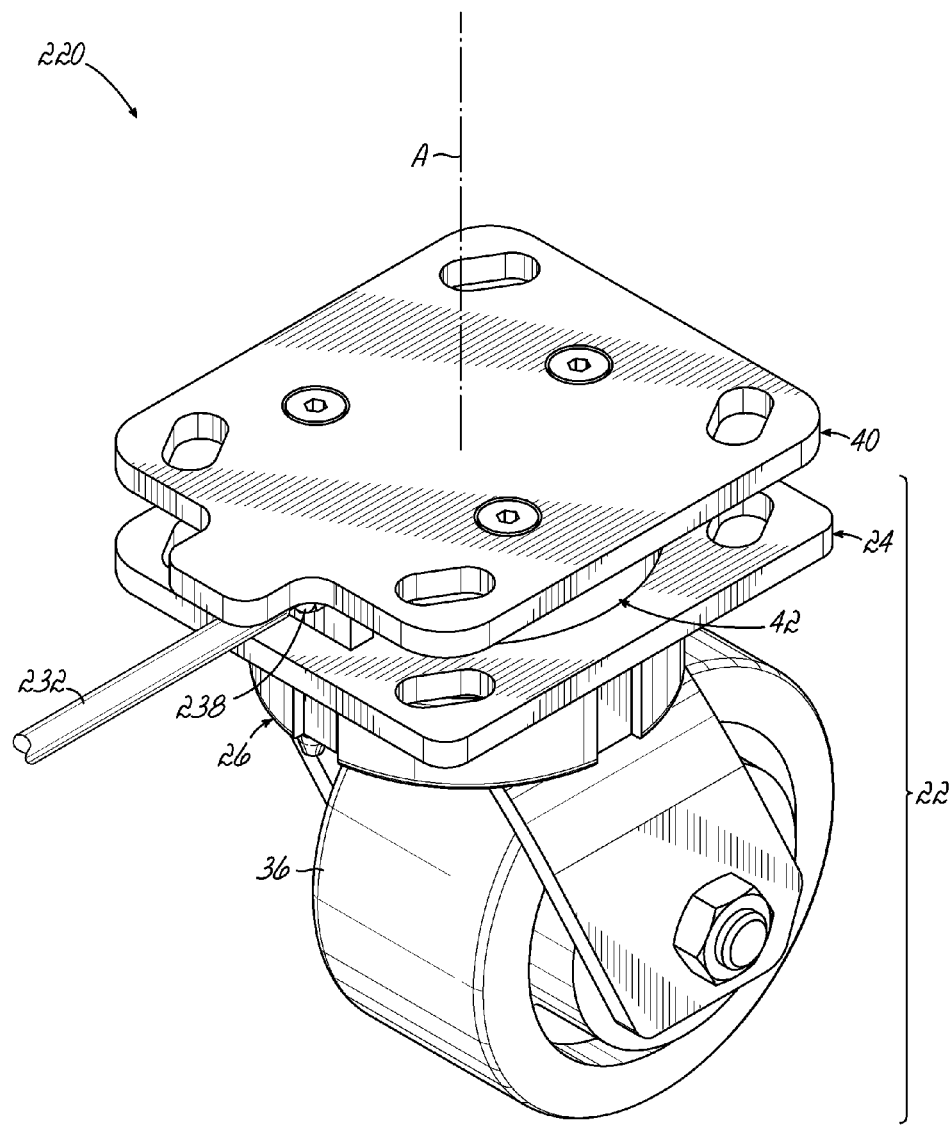
FIG. 9 is an isometric view of the braking system shown in FIG. 8 in which the actuator includes a control cable and a hand lever.
Figure 10:
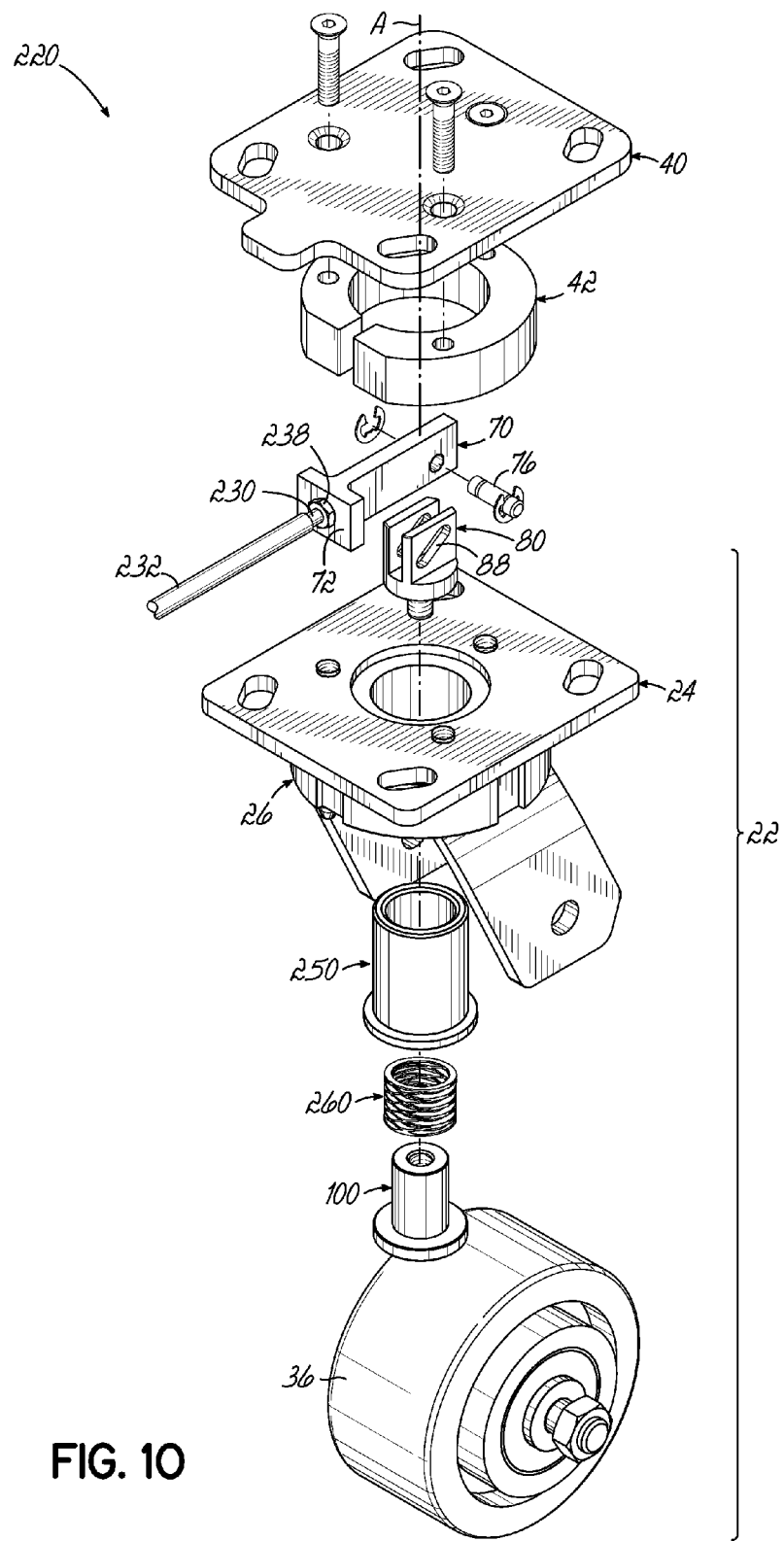
FIG. 10 is a partially disassembled view of the braking system of FIG. 9.

As shown particularly in FIGS. 8 through 10, the actuator of braking system 220 includes a control cable 230 and a hand lever 240 for exerting a tension force on the control cable 230. As better shown in FIGS. 11A and 12A, the control cable 230 is preferably housed within a protective sheath 232 and includes a threaded end 234 that is inserted into and threadedly engaged with a threaded hole 236 provided on the plunger contact face 72. The threaded end 234 may be provided with a retaining nut 238 for tightening or loosening the engagement of the threaded end 234 with the threaded hole 236. The coupling of the control cable 230 with the movable plunger 70 enables the control cable 230 to exert a tension force on the movable plunger 70 in a horizontal direction away from the central axis A.

Figure 11:
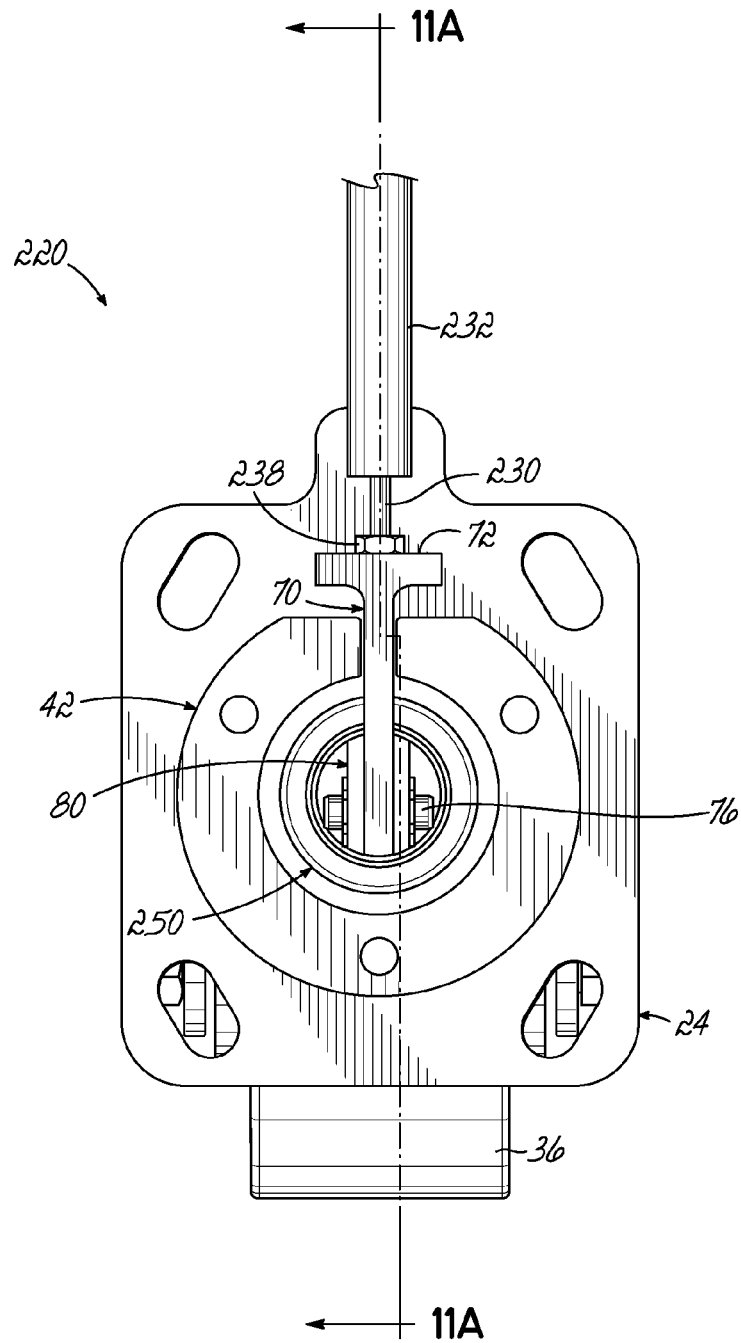
FIG. 11 is a top elevational view of the braking system of FIG. 9, with an upper mounting plate hidden, showing the control cable in a first cable position.
Figure 11A:
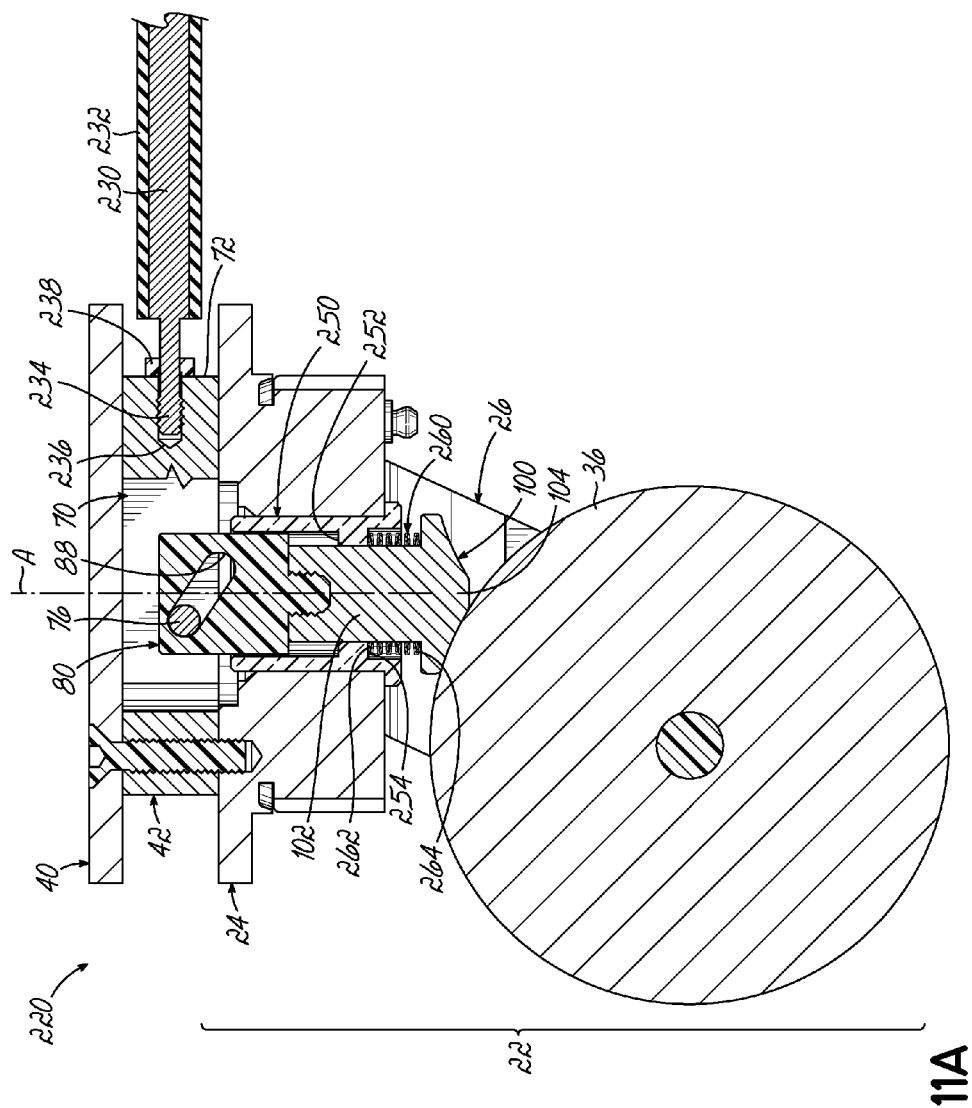
FIG. 11A is a cross-sectional view of the braking system of FIG. 11, taken along section line 11A-11A, showing the brake shoe in the extended, braking position when the control cable is in a first cable position and the hand lever is in a first hand lever position.
Figure 12:
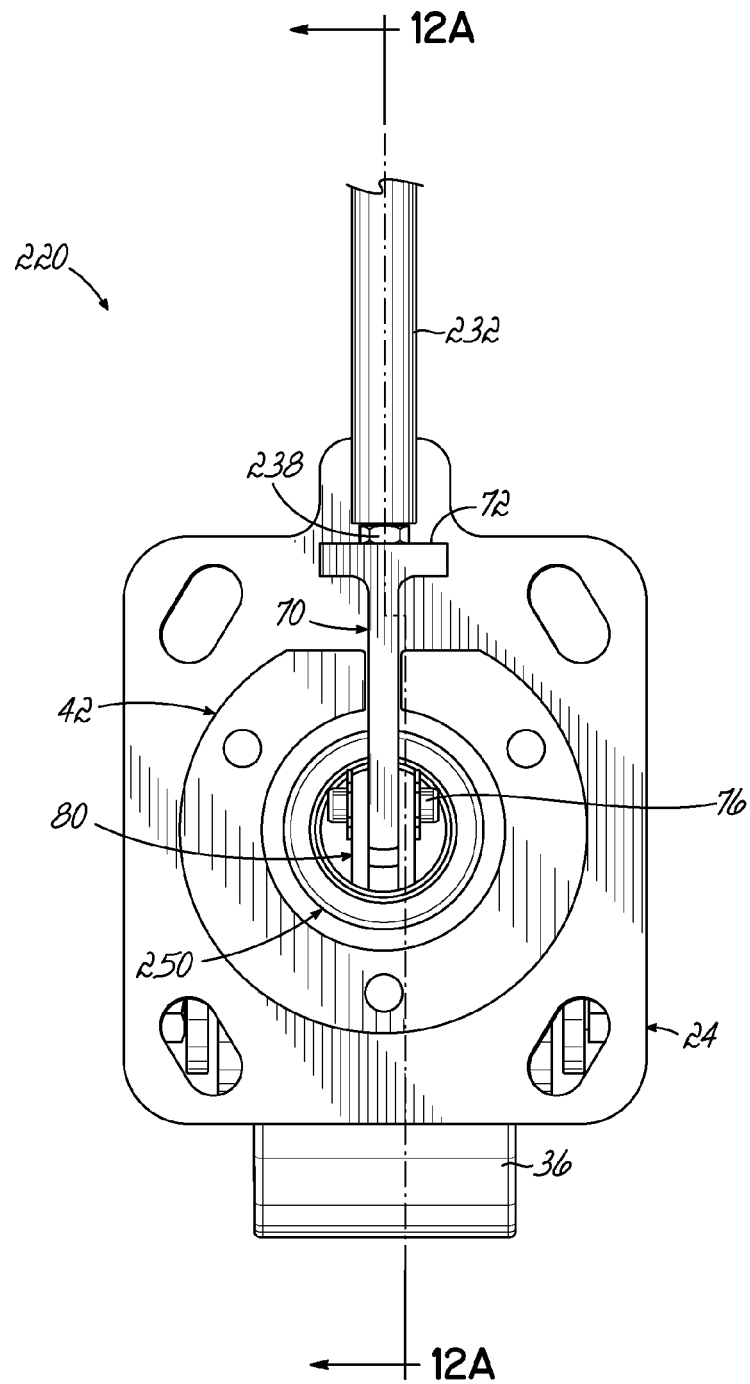
FIG. 12 is a top elevational view of the braking system of FIG. 9, with the upper mounting plate hidden, showing the control cable in a second cable position.
Figure 12A:
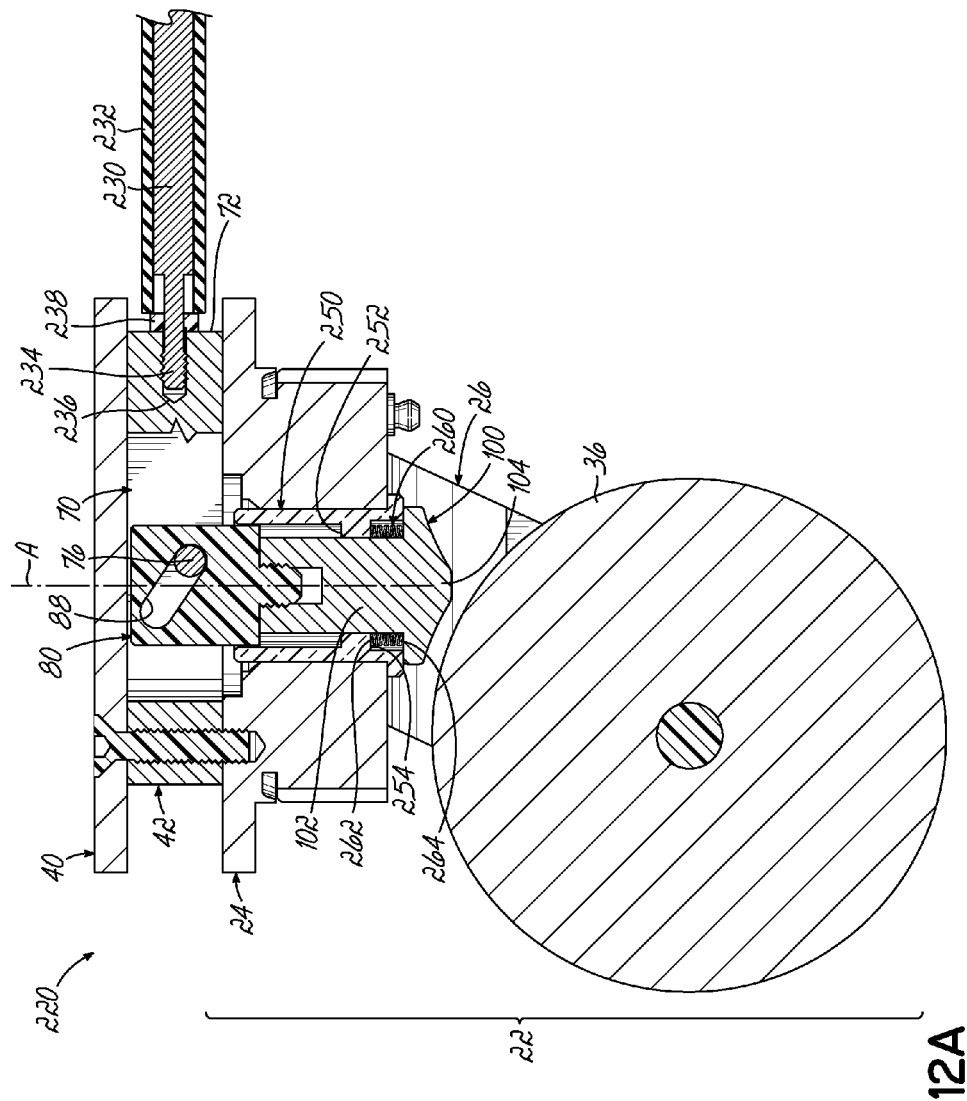
FIG. 12A is a cross-sectional view of the braking system of FIG. 12, taken along section line 12A-12A, showing the brake shoe in the retracted, non-braking position when the control cable is in a second cable position and the hand lever is in a second hand lever position.

As shown in FIGS. 10, 11A, and 12A, the braking system 220 includes a bushing 250 and a spring 260 of a different structure and placement than the corresponding elements of the braking system 20, in order to provide the dead man type braking function. The bushing 250 includes an upper internal base surface 252 and a lower internal base surface 254, each being disposed between the two opposed ends of the bushing 250. The spring 260, shown as a compression spring, is positioned only partly within the bushing 250 and surrounds a portion of the length of the shaft portion 102 of the brake shoe 100. The spring 260 has an upper spring end 262 that is positioned adjacent to the lower internal base surface 254 of the bushing 250, and a lower spring end 264 that is positioned adjacent to the toe 104 of the brake shoe 100.

Referring back to FIG. 8, the hand lever 240 is mounted to the transport vehicle, shown as platform truck or cart 10, at a location at which it is easily reached and manipulated by the hand of an operator. For example, as shown, the hand lever 240 is rotatably coupled with a perch 242 that is mounted to an upper portion of the transport bar 18. The control cable 230 is coupled with the hand lever 240 such that rotating the hand lever 240 toward a second hand lever position, for example by squeezing the hand lever 240, results in the exertion of a tension force by the hand lever 240 on the control cable 230. As shown, the control cable 230 has a sufficient length for routing from the location of the hand lever 240 to the location of the movable plunger 70. To prevent any excessive length of the control cable 230 from interfering with use of the transport vehicle, the control cable 230 may be secured to the vehicle by any suitable means. For example, as shown, strap elements 244 may be wrapped or otherwise positioned around the protective sheath 232 and a portion of the transport bar 18 at various positions along the length of the control cable 230. Additionally, as shown in FIG. 8, the transport vehicle may be provided with multiple braking systems 220, wherein each braking system 220 may share a common hand lever 240.

FIGS. 11 through 12A show additional detail of the braking system 220 when the hand lever 240 is rotated or otherwise manipulated between first and second hand lever positions to actuate the control cable 230 between first and second cable positions and thereby move the brake shoe 100 between the extended, braking position and the retracted, non-braking position. As discussed above, the braking system 220 operates as a dead man type brake. Specifically, the brake shoe 100 remains in the extended, braking position, under the spring force provided by spring 260, unless and until an operator applies and continuously maintains a tension force on the control cable 230 to move the brake shoe 100 toward the retracted, non-braking position. Upon release of the tension force, the brake shoe 100 moves back to the extended, braking position.

FIGS. 11 and 11A show respectively a top elevational view, with the upper mounting plate 40 hidden, and a corresponding side cross-sectional view of the braking system 220 in which the control cable 230 is in the first cable position when the hand lever 240 is in the first hand lever position. The hand lever 240 in the first hand lever position is in a neutral state and not being manipulated by an operator, and thus exerts no tension force on the control cable 230. In turn, the control cable 230 exerts no horizontal force on the movable plunger 70 sufficient to cause outward horizontal movement of the movable plunger 70. In turn, the movable plunger 70 exerts no horizontal force, through the clevis pin 76, on the angled slots 88 of the adapter 80 sufficient to cause upward vertical movement of the adapter 80. In turn, the adapter 80 exerts no vertical force on the brake shoe 100 sufficient to cause upward vertical movement of the brake shoe 100. The spring 260 biases the brake shoe 100 vertically downward, and the brake shoe 100 is thus held in the extended, braking position in engagement with the wheel 36 when the control cable 230 and hand lever 240 are in the first cable position and the first hand lever position, respectively.

FIGS. 12 and 12A show respectively a top elevational view, with the upper mounting plate 40 hidden, and a corresponding side cross-sectional view of the braking system 220 in which the control cable 230 is in the second cable position when the hand lever 240 is in the second hand lever position. The hand lever 240 may be moved into the second hand lever position by an operator who squeezes or otherwise manipulates the hand lever 240. As the hand lever 240 is moved toward the second hand lever position, the hand lever 240 exerts a tension force on the control cable 230 sufficient to cause the control cable 230 to move in a direction toward the hand lever 240. If the protective sheath 232 has been fixed to the transport vehicle such that it is prevented from moving with the control cable 230, the protective sheath 232 will remain stationary as the control cable 230 slides within the protective sheath 232. In turn, the control cable 230 exerts a horizontal tension force on the movable plunger 70 sufficient to cause the movable plunger 70 to translate horizontally outward from the central axis A. In turn, the movable plunger 70 exerts a horizontal tension force, through the clevis pin 76, on the angled slots 88 of the adapter 80. The angled slots 88 convert this horizontal tension force to a vertical tension force sufficient to cause the adapter 80 to translate vertically upward along the central axis A. In turn, the adapter 80 exerts a vertical tension force on the brake shoe 100 sufficient to cause the brake shoe 100 to translate vertically upward toward the retracted, non-braking position in which the toe 104 of the brake shoe 100 does not contact the caster wheel 36. In turn, the brake shoe 100 compresses the spring 260, which thereby operates to bias the brake shoe 100 back toward the extended, braking position. Accordingly, when the operator ceases to hold the hand lever 240 in the second hand lever position, a tension force is no longer applied to the control cable 230 and the spring force exerted by the spring 260 causes the brake shoe 100 to return to the extended, braking position to completely block or at least partially hinder rotation of the caster wheel 36.

As used herein, the terms "vertical" and "horizontal" and variations thereof are to be understood with reference to the structure of the caster 22, as shown. Specifically, the term "vertical" refers to a direction that is parallel with the vertically oriented central axis A of the caster 22. The term "horizontal" refers to a direction that is transverse to the central axis A and, for example, parallel to the caster plate 24.

Similarly, as used herein, the terms "upward" and "downward" and variations thereof are to be understood with reference to the vertically oriented central axis A and the caster 22. Specifically, the term "upward" refers to movement that is parallel to the central axis A and in a direction from the caster wheel 36 toward the caster plate 24. The term "downward" also refers to movement that is parallel to the central axis A but in a direction from the caster plate 24 toward the caster wheel 36.

Similarly, as used herein, the terms "inward" and "outward" and variations thereof are also to be understood with reference to the vertically oriented central axis A. Specifically, the term "inward" refers to movement that is transverse to and in a radial direction toward the central axis A. The term "outward" refers to movement that is transverse to and in a radial direction away from the central axis A.

Accordingly, persons skilled in the art will appreciate that the terms "vertical," "horizontal," "upward," "downward," "inward," or "outward," and their variations as used herein, may adopt different meanings with respect to a ground surface depending on the orientation in which the caster 22 is mounted to a transport vehicle.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. caster wheel braking system for braking rotation of a caster wheel, comprising:
   a caster including a caster plate, a horn base coupled with the caster plate and rotatable about a vertical axis, a pair of legs extending downwardly from the horn base, and at least one caster wheel coupled with the pair of legs and rotatable about a horizontal axis defined by a caster wheel axle;
   a mounting plate spaced from the caster by a spacer;
   a movable plunger disposed between the caster plate and the mounting plate and horizontally movable through a slot provided in the spacer;
   a brake shoe vertically movable by the movable plunger between a non-braking position in which the at least one caster wheel is permitted to rotate and a braking position in which the brake shoe exerts a braking force on the at least one caster wheel to at least partially hinder rotation of the at least one caster wheel;
   a vertically movable adapter with at least one angled slot, the adapter connected with the brake shoe, the adapter and brake shoe biased by a biasing element towards the non-braking position; and
   a pin coupled with the movable plunger and configured to slide in the at least one angled slot of the adapter to convert horizontal movement of the movable plunger to vertical movement of the brake shoe.

2. The braking system of claim 1, further comprising:
   an actuator configured to move the movable plunger to thereby cause movement of the brake shoe between the non-braking and braking positions.

3. The braking system of claim 2, wherein the actuator is coupled with the mounting plate.

4. The braking system of claim 2, wherein the actuator includes a brake lever rotatable about a vertical axis.

5. The braking system of claim 4, wherein the actuator further includes a cam attached to the brake lever and configured to convert rotational movement of the brake lever into horizontal translational movement of the movable plunger.

6. The braking system of claim 5, wherein the movable plunger is substantially T-shaped.

7. The braking system of claim 1, wherein a vertical distance between the brake shoe and the movable plunger is adjustable when the brake shoe is in the non-braking position.

8. The braking system of claim 1, wherein at least a portion of the at least one caster wheel is composed of a polymer and at least a portion of the brake shoe is composed of a metal.

9. The braking system of claim 8, wherein at least a portion of the at least one caster wheel is composed of a plastic material.

10. The braking system of claim 8, wherein at least a portion of the at least one caster wheel is composed of a polyurethane material.

11. The braking system of claim 8, wherein at least a portion of the brake shoe is composed of a polymer.

12. The braking system of claim 1, wherein at least a portion of the at least one caster wheel is composed of a metal and at least a portion of the brake shoe is composed of a polymer.

13. The braking system of claim 1, wherein the at least one caster wheel includes two caster wheels.

14. A transport vehicle configured to move along a ground surface and including at least one caster wheel braking system for braking rotation of a caster wheel, the at least one caster wheel braking system comprising:
 a caster coupled with the transport vehicle, the caster including a caster plate, a horn base coupled with the caster plate and rotatable about a vertical axis, a pair of legs extending downwardly from the horn base, and at least one caster wheel coupled with the pair of legs and rotatable about a horizontal axis defined by a caster wheel axle;
 a mounting plate spaced from the caster by a spacer;
 a movable plunger disposed between the caster plate and the mounting plate and horizontally movable through a slot provided in the spacer;
 a brake shoe vertically movable by the movable plunger between a non- braking position in which the at least one caster wheel is permitted to rotate and a braking position in which the brake shoe exerts a braking force on the at least one caster wheel to at least partially hinder rotation of the at least one caster wheel;
 a vertically movable adapter with at least one angled slot, the adapter connected with the brake shoe, the adapter and brake shoe biased by a biasing element towards the non-braking position; and
 a pin coupled with the movable plunger and configured to slide in the at least one angled slot of the adapter to convert horizontal movement of the plunger to vertical movement of the brake shoe.

15. The transport vehicle of claim 14, further comprising:
 a brake lever rotatable about a vertical axis and configured to move the movable plunger to thereby cause movement of the brake shoe between the non- braking and braking positions.

16. The transport vehicle of claim 14, wherein the at least one caster wheel braking system includes at least two of the caster wheel braking systems.

17. A caster wheel braking system for braking rotation of a caster wheel, comprising:
 a caster including a caster plate, a horn base coupled with the caster plate and rotatable about a vertical axis, a pair of legs extending downwardly from the horn base, and at least one caster wheel coupled with the pair of legs and rotatable about a horizontal axis defined by a caster wheel axle;
 a mounting plate spaced from the caster by a spacer;
 a movable plunger disposed between the caster plate and the mounting plate and horizontally movable through a slot provided in the spacer;
 a brake shoe vertically movable by the movable plunger between a non- braking position in which the at least one caster wheel is permitted to rotate and a braking position in which the brake shoe exerts a braking force on the at least one caster wheel to at least partially hinder rotation of the at least one caster wheel;
 a biasing element adjacent to the brake shoe and configured to bias the brake shoe toward the non-braking position;
 a vertically movable adapter with at least one angled slot, the adapter connected with the brake shoe, the adapter and brake shoe biased by the biasing element towards the non-braking position; and
 a pin coupled with the movable plunger and configured to slide in the at least one angled slot of the adapter to convert horizontal movement of the plunger to vertical movement of the brake shoe.

18. The braking system of claim 17, further comprising:
 an actuator configured to move the movable plunger to thereby cause movement of the brake shoe between the non-braking and braking positions.

19. The braking system of claim 18, wherein the actuator is coupled with the mounting plate.

20. The braking system of claim 18, wherein the actuator includes a brake lever rotatable about a vertical axis.

* * * * *